United States Patent
Azuma et al.

(10) Patent No.: US 8,203,825 B2
(45) Date of Patent: Jun. 19, 2012

(54) DIELECTRIC CERAMICS AND MULTILAYER CERAMIC CAPACITOR

(75) Inventors: Yusuke Azuma, Kirishima (JP); Youichi Yamazaki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 293 days.

(21) Appl. No.: 12/595,938

(22) PCT Filed: Mar. 21, 2008

(86) PCT No.: PCT/JP2008/055312
§ 371 (c)(1),
(2), (4) Date: Oct. 14, 2009

(87) PCT Pub. No.: WO2008/132902
PCT Pub. Date: Nov. 6, 2008

(65) Prior Publication Data
US 2010/0128414 A1    May 27, 2010

(30) Foreign Application Priority Data

Apr. 20, 2007 (JP) ................................. 2007-111421
Aug. 28, 2007 (JP) ................................. 2007-220619

(51) Int. Cl.
*H01G 4/06* (2006.01)
(52) U.S. Cl. .................. 361/313; 361/321.2; 361/321.3; 361/321.4; 361/321.5; 361/311
(58) Field of Classification Search ............. 361/321.2, 361/321.3, 321.4, 321.5, 311, 313; 257/306, 257/307, 532
See application file for complete search history.

(56) References Cited

U.S. PATENT DOCUMENTS

| 6,628,502 B2 * | 9/2003 | Masumiya et al. ........ 361/321.2 |
| 7,786,036 B2 * | 8/2010 | Komatsu et al. ............... 501/139 |
| 2001/0035563 A1 | 11/2001 | Masumiya et al. ........... 257/532 |
| 2008/0115876 A1 | 5/2008 | Komatsu et al. ........... 156/89.14 |

FOREIGN PATENT DOCUMENTS

| JP | 08-124785 | 5/1996 |
| JP | 2001-135544 | 5/2001 |
| JP | 2001-345230 | 12/2001 |
| JP | 2002-029835 | 1/2002 |
| JP | 2004-247719 | 9/2004 |
| JP | 2006-298677 | 11/2006 |
| JP | 2006-347799 | 12/2006 |
| WO | 2006-104026 A1 | 10/2006 |

* cited by examiner

*Primary Examiner* — Nguyen T Ha
*Assistant Examiner* — Hung Dang
(74) *Attorney, Agent, or Firm* — DLA Piper LLP (US)

(57) ABSTRACT

To provide a dielectric ceramics achieving a high insulation resistance even at a low applied voltage, and minimizing insulation resistance drop when the voltage is increased, and also provide a multilayer ceramic capacitor including the dielectric ceramics as a dielectric layer, and having excellent life characteristics in a high temperature load test. The dielectric ceramics has crystal grains composed mainly of barium titanate and containing vanadium, and a grain boundary phase existing between the crystal grains. The dielectric ceramics contains 0.0005 to 0.03 moles of vanadium in terms of $V_2O_5$, with respect to 1 mole of barium constituting the barium titanate. In the X-ray diffraction chart of the dielectric ceramics, the diffraction intensity of (004) plane indicating the tetragonal system of barium titanate is larger than the diffraction intensity of (400) plane indicating the cubic system of barium titanate.

7 Claims, 3 Drawing Sheets

DIELECTRIC CERAMICS AND MULTILAYER CERAMIC CAPACITOR

CROSS-REFERENCE TO THE RELATED APPLICATIONS

This application is a national stage of International Application No. PCT/JP2008/055312 filed on Mar. 21, 2008 and claims the benefit of priority under 35 USC 119 of Japanese Patent Application No. 2007-111421 filed on Apr. 20, 2007 and Japanese Patent Application No. 2007-220619 filed on Aug. 28, 2007, which applications are incorporated herein by reference.

TECHNICAL FIELD

The invention relates to a dielectric ceramics constructed from crystal grains composed mainly of barium titanate, and a multilayer ceramic capacitor using the dielectric ceramics as a dielectric layer.

BACKGROUND ART

In recent years, mobile equipments such as cellular phones have been spread, and semiconductor devices as the main components of personal computers have had higher speed and higher frequency. Accordingly, the multilayer ceramic capacitors mounted on these electronics equipments are increasingly required to become compact high capacity for use in power sources, and the dielectric layers constituting the multilayer ceramic capacitors are required to become thinner and highly laminated.

Conventionally, dielectric constant materials composed mainly of barium titanate have been used as a dielectric ceramics for a dielectric layer constituting a multilayer ceramic capacitor. Recently, the dielectric ceramics has been developed in which oxide powders such as magnesium, rare earth element and vanadium are added to barium titanate powder, and the magnesium and the rare earth element are dissolved to form a solid solution in the vicinity of the surfaces of crystal grains composed mainly of barium titanium. The above dielectric ceramics has been practiced as a multilayer ceramic capacitor (refer to, for example, patent document 1 and patent document 2).

For example, in the patent document 1, attempts to improve characteristics such as dielectric breakdown voltage and IR accelerated aging are made by incorporating magnesium, rare earth element and vanadium into barium titanate as the main ingredient of the crystal grains constituting the dielectric layer as described above, thereby obtaining the crystal structure (so-called core-shell structure) in which the diffraction line of (200) plane and the diffraction line of (002) plane are partially overlapped with each other in an X-ray diffraction chart, resulting in a wide diffraction line.

Also in the patent document 2, attempts to improve life characteristics are made by forming the core-shell structure having a shell phase that has a proper concentration gradient of vanadium within crystal grains. That is, the excessive diffusion of vanadium into barium titanate and the deposition of a vanadium compound are suppressed, while suppressing the movement of electrons existing in the crystal grains by adjusting the valiance of vanadium dissolved in the barium titanate to form a solid solution, into a range around tetravalent.

As used herein, the term "core-shell structure" of the crystal grains refers to the structure that a core part as the central part of the crystal grains and a shell part as the outer shell part thereof form physically and chemically different phases. The crystal grains composed mainly of barium titanate exist in the state in which the core part is occupied by barium titanate having a tetragonal crystal structure, and the shell part is occupied by the barium titanate having a cubic crystal structure.

Patent document 1: Japanese Unexamined Patent Application Publication No. 8-124785

Patent document 1: Japanese Unexamined Patent Application Publication No. 2006-347799

DISCLOSURE OF THE INVENTION

Problems to be Solved by the Invention

However, those in which the crystal grains constituting the dielectric layer have the core-shell structure, as in the above patent documents 1 and 2, suffer from the problem that a high insulation resistance is obtained at a low applied voltage, whereas the insulation resistance drops greatly when the applied voltage is increased.

Additionally, in the multilayer ceramic capacitors including, as the dielectric layer, the dielectric ceramics whose crystal grains have the core-shell structure, as in the above patent documents 1 and 2, it is difficult to satisfy life characteristics in a high temperature load test when the dielectric layer is made thinner, because of a drop in the insulation resistance of the dielectric ceramics.

Accordingly, the object of the present invention is to provide a dielectric ceramics achieving a high insulation resistance even at a low applied voltage, and minimizing the insulation resistance drop when the voltage is increased; and also to provide a multilayer ceramic capacitor including the dielectric ceramics as a dielectric layer, and having excellent life characteristics in the high temperature load test.

Means for Solving the Problems

The dielectric ceramics of the invention comprises crystal grains composed mainly of barium titanate and containing vanadium, and a grain boundary phase existing between the crystal grains. The dielectric ceramics contains 0.0005 to 0.03 moles of vanadium in terms of $V_2O_5$, with respect to 1 mole of barium constituting the barium titanate. In the X-ray diffraction chart of the dielectric ceramics, the diffraction intensity of (004) plane indicating the tetragonal system of barium titanate is larger than the diffraction intensity of (400) plane indicating the cubic system of barium titanate.

Preferably, the dielectric ceramics may contain magnesium within the crystal grains. More preferably, the dielectric ceramics may contain 0.0005 to 0.003 moles of vanadium in terms of $V_2O_5$, 0 to 0.001 moles of magnesium in terms of MgO, 0 to 0.005 moles of manganese in terms of MnO, and 0.004 to 0.015 moles of one kind of rare earth element (RE) selected from yttrium, dysprosium, holmium and erbium in terms of $RE_2O_3$, with respect to 1 mole of barium constituting the barium titanate.

In this case, the content of the magnesium is preferably zero mole in terms of MgO, and the content of the manganese is preferably zero mole in terms of MnO. It is further preferable to contain 0.003 moles or less of terbium in terms of $Tb_4O_7$, with respect to 1 mole of barium constituting the barium titanate.

The multilayer ceramic capacitor of the invention is constructed from a laminate made up of a dielectric layers composed of the above dielectric ceramics, and an inner electrode layers.

Effect of the Invention

The dielectric ceramics of the invention is adapted to have the crystal grains composed mainly of barium titanate and containing vanadium in a predetermined proportion, and the grain boundary phase existing between the crystal grains, in which in the X-ray diffraction chart of the dielectric ceramics, the diffraction intensity of (004) plane indicating the tetragonal system of barium titanate is larger than the diffraction intensity of (400) plane indicating the cubic system of barium titanate. This produces the effect that a high insulation resistance is obtained even at a low applied voltage, and the insulation resistance drop is small when the voltage is increased (namely, the voltage dependence of insulation resistance is small).

When magnesium is contained in the crystal grains, the Curie temperature of the dielectric ceramics can be easily changed by the content of magnesium, into an arbitrary temperature in a temperature range of below 125° C. This achieves the dielectric ceramics having a maximum relative dielectric constant in the vicinity of a desired temperature.

In cases where in the present invention, vanadium, magnesium, manganese and rare earth element (RE) are contained in their respective predetermined proportions with respect to the barium titanate, the insulation resistance becomes high, and the voltage dependence against insulation resistance becomes small. Further, a high dielectric constant is achieved and the temperature change of relative dielectric constant satisfies X7R characteristic of EIA standard.

In this case, when the content of magnesium is zero mole in terms of MgO, a high dielectric constant is achieved and the temperature change of relative dielectric constant satisfies the X7R characteristic of EIA standard, and a high insulation resistance is obtained when the applied voltage is low, and the insulation resistance becomes high when the voltage is increased, thereby achieving the dielectric ceramics having more excellent insulation properties.

When the content of manganese is zero mole in terms of MnO, the dielectric ceramics having small voltage dependence of insulation resistance can be obtained, and dielectric loss can be decreased.

The multilayer ceramic capacitor of the invention employs the above dielectric ceramics as a dielectric layer. Therefore, even if the dielectric layer is made thinner, high insulation properties is ensured, thus exhibiting excellent life characteristics in the high temperature load test.

PREFERRED EMBODIMENTS FOR CARRYING OUT THE INVENTION

First Preferred Embodiment

Figure 1:
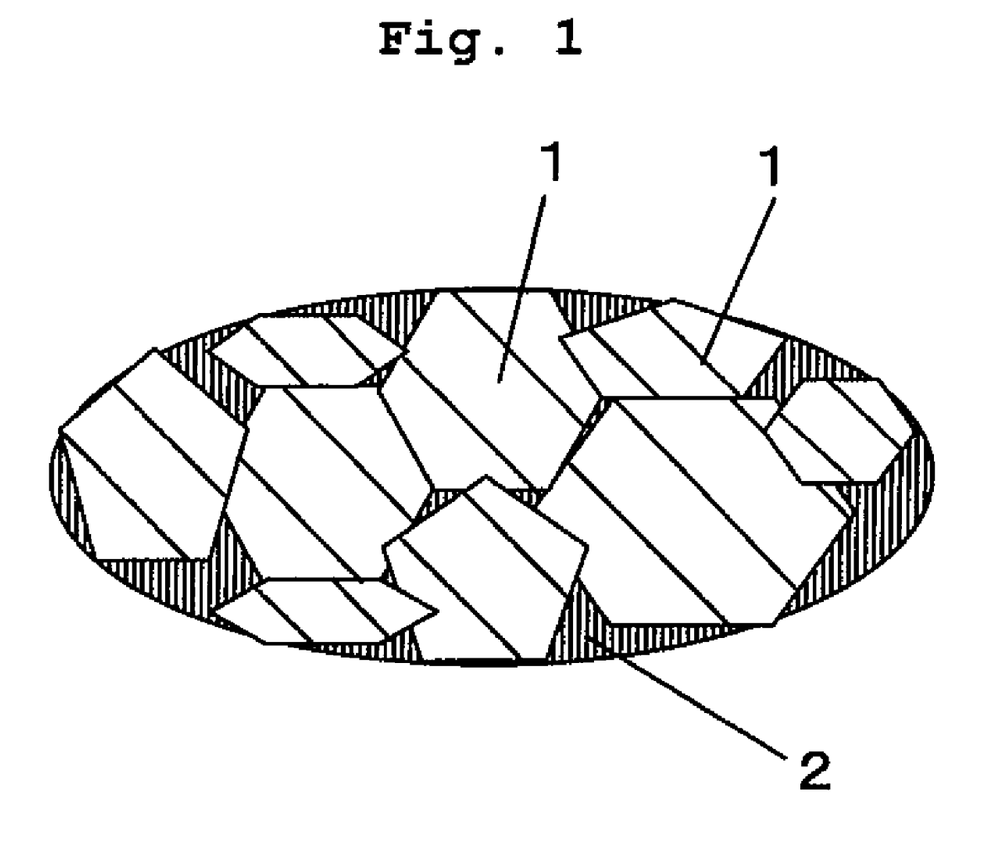
FIG. 1 is a sectional schematic diagram showing the fine structure of the dielectric ceramics of the invention.

FIG. 1 is an enlarged diagram of the dielectric ceramics according to the present preferred embodiment, specifically a schematic diagram showing crystal grains and a grain boundary phase. The dielectric ceramics of the present preferred embodiment has crystal grains 1 composed mainly of barium titanate, and the grain boundary 2 existing between these crystal grains 1. The crystal grains 1 contain vanadium. Most part of the vanadium are dissolved into the crystal grains 1 to form a solid solution, and the content of vanadium in the dielectric ceramics is 0.0005 to 0.03 moles in terms of $V_2O_5$, with respect to 1 mole of barium constituting the barium titanate. In the X-ray diffraction chart of the dielectric ceramics, the diffraction intensity of the (004) plane indicating the tetragonal system of barium titanate is larger than the diffraction intensity of the (400) plane indicating the cubic system of barium titanate.

By forming the dielectric ceramics with the above composition, and by adjusting the crystal structure of the crystal grains 1 constituting the dielectric ceramics so as to have the above relationship of the diffraction intensity in the X-ray diffraction chart, the insulation resistance at a high temperature (85° C.) measured by setting DC voltage values applied per unit thickness to 0.1 V and 2.5 V can be increased above $10^4 \Omega$, respectively. Consequently, the insulation resistance drop rate measured by setting the DC voltage values applied per unit thickness to 0.1 V and 2.5 V can be reduced below 30%, and relative dielectric constant can be increased above 2010.

The reason why the insulation resistance is measured at the high temperature (85° C.) is that upon the application of voltage at room temperature, the absorbed current into the dielectric ceramics causes fluctuations in the measured values, making them unstable.

If the insulation resistance per unit thickness is above $10^4 \Omega$ at 85° C., the dielectric ceramics has high insulation properties and hence can properly exhibit dielectric properties such as relative dielectric constant. On the other hand, if the insulation resistance per unit thickness is below $10^4 \Omega$ at 85° C., the dielectric properties cannot be obtained properly due to insulation breakdown.

Further, if the insulation resistance drop rate is below 30% when measured by setting the DC voltage values applied per unit thickness to 0.1 V and 2.5 V, there is the advantage of being able to increase the insulation breakdown voltage of the dielectric ceramics. On the other hand, if the insulation resistance drop rate is above 30% when measured by setting DC voltage values applied per unit thickness to 0.1 V and 2.5 V, the insulation breakdown voltage of the dielectric ceramics is low, and dielectric characteristics fluctuates widely in response to the change of applied voltage.

The crystal structure of the dielectric ceramics of the invention will now be described in more detail. The dielectric ceramics of the invention is occupied by a crystal phase close to a haploid phase, almost all of which show the tetragonal system even if vanadium is dissolved into the crystal grains 1 to form a solid solution.

Figure 2:
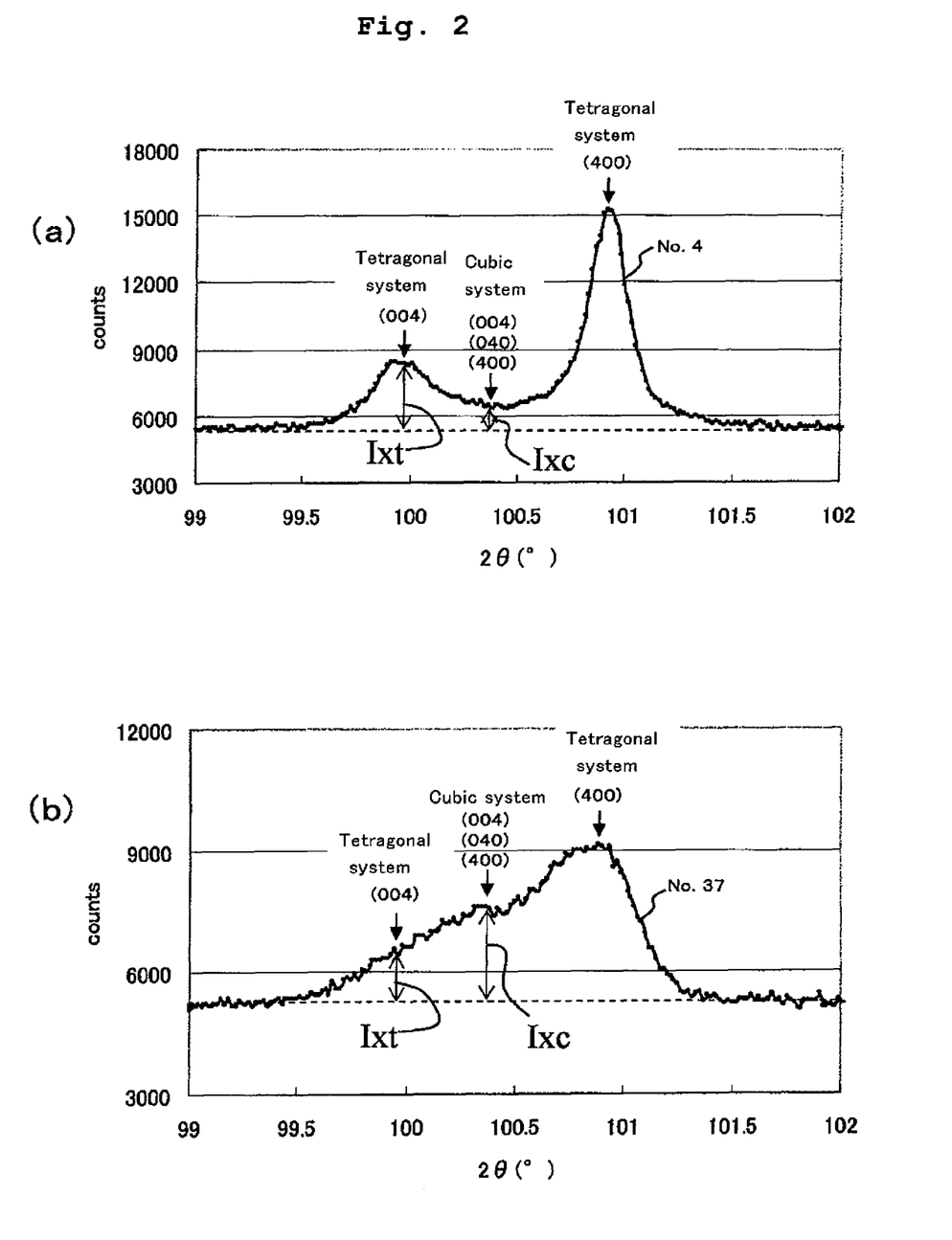
FIG. 2(a) is a drawing showing the X-ray diffraction chart of Sample No. I-4 in Example I.
FIG. 2(b) is a drawing showing the X-ray diffraction chart of Sample No. I-37 as a comparative example.

FIG. 2(a) shows the X-ray diffraction chart of Sample No. I-4, which is the dielectric ceramics of the invention in Example I described later, and FIG. 2(b) shows the X-ray diffraction chart of Sample No. I-37, as the dielectric ceramics of a comparative example.

In the conventional dielectric ceramics as described in the patent document 1 and the patent document 2, their respective crystal structures are the core-shell structures, which correspond to the X-ray diffraction chart of FIG. 2(b).

That is, in the dielectric ceramics constructed from the crystal grains 1 using barium titanate as a main ingredient and having the core-shell structure, the diffraction intensity of the (400) plane ((040) plane and (004) plane are overlapped with each other) indicating the cubic system of barium titanate appearing between the (004) plane and the (400) plane indicating the tetragonal system of barium titanate is larger than the diffraction intensity of the (004) plane indicating the tetragonal system of barium titanate.

Further, the dielectric ceramics constructed from the crystal grains showing the core-shell structure exhibits weak crystal anisotropism because the ratio of the crystal phase of cubic system is larger than the ratio of the crystal phase of tetragonal system. Therefore, in the X-ray diffraction chart, the diffraction line of the (400) plane is shifted to low angle side, and the diffraction line of the (004) plane is shifted to high angle side, so that both diffraction lines are at least partially overlapped with each other thereby to produce a wide diffraction line.

The above dielectric ceramics are manufactured by forming one in which oxide powders such as magnesium, rare earth element and the like are added and mixed into powder composed mainly of barium titanate, followed by reduction firing. Hereat, the crystal grains 1 having the core-shell structure has a small amount of solid solution of ingredients such as the magnesium and the rare earth element in the core part, and hence the interior of the crystal grains has a large number of defects such as oxygen vacancies. It is therefore considered that upon the application of DC voltage, the oxygen vacancies are liable to become carriers transferring charge in the interior of the crystal grains, thereby deteriorating the insulation properties of the dielectric ceramics.

On the contrary, in the dielectric ceramics of the invention, in the X-ray diffraction chart of the dielectric ceramics, the diffraction intensity of the (004) plane indicating the tetragonal system of barium titanate is larger than the diffraction intensity of the (400) plane indicating the cubic system of barium titanate, as shown in FIG. 2(a).

That is, in the dielectric ceramics of the invention, the X-ray diffraction peaks of the (004) plane (2θ=around 100°) and the (400) plane (2θ=around 101°) indicating the tetragonal system of barium titanate appear clearly as shown in FIG. 2(a), and the diffraction intensity of the (400) plane (the (040) plane and the (004) plane are overlapped with each other) indicating the cubic system of barium titanate appearing between the (004) plane and the (400) plane indicating the tetragonal system of barium titanate is smaller than the diffraction intensity of the (004) plane indicating the tetragonal system of barium titanate.

Especially, in the dielectric ceramics of the invention, the Ixt/Ixc ratio is preferably 1.6 to 3.1, particularly 2.2 to 3.1, where Ixt is the diffraction intensity of the (004) plane indicating the tetragonal system of barium titanate, and Ixc is the diffraction intensity of the (400) plane indicating the cubic system of barium titanate. This increases the ratio of the crystal phase of tetragonal system, thereby further reducing the change rate of insulation resistance.

The above dielectric ceramics of the invention becomes a nearly uniform crystal phase of tetragonal system even if it contains vanadium. Hence, the vanadium is dissolved throughout these crystal grains 1 to form a solid solution. It is therefore considered that the generation of defects such as oxygen vacancies in the interior of the crystal grains 1 is suppressed thereby to minimize the carriers transferring charge, enabling to prevent deterioration of the insulation properties of the dielectric ceramics during the DC voltage application.

In cases where the content of vanadium is less than 0.0005 moles in terms of $V_2O_5$ with respect to 1 mole of barium contained in the dielectric ceramics of the invention, however, the insulation resistance drop rate becomes larger than 30% when measured by setting the DC voltage values applied per unit thickness (1 μm) to 0.1 V and 2.5 V. In cases where the content of vanadium is more than 0.03 moles in terms of $V_2O_5$ with respect to 1 mole of barium, the insulation resistance becomes lower than $10^4 \Omega$ when measured by setting the DC voltage value applied per unit thickness (1 μm) to 0.1 V. Hence, the dielectric ceramics of the invention contains 0.0005 to 0.03 moles, preferably 0.001 to 0.03 moles of vanadium in terms of $V_2O_5$ with respect to 1 mole of barium. Thus, the insulation resistance drop rate can be reduced below 27% when measured by setting the DC voltage values applied per unit thickness (1 μm) to 0.1 V and 2.5 V.

Preferably, the dielectric ceramics of the invention contains magnesium within the crystal grains 1. When magnesium is contained in the crystal grains, the Curie temperature of the dielectric ceramics can be easily changed by the content of magnesium, into an arbitrary temperature in a temperature range of below 125° C. This achieves the dielectric ceramics having a maximum relative dielectric constant in the vicinity of a desired temperature. For example, by setting the content of magnesium contained in the dielectric ceramics to 0.01 to 0.03 moles in terms of MgO with respect to 1 mole of barium, the Curie temperature can be adjusted arbitrarily in the range of 30 to 120° C.

Alternatively, the dielectric ceramics of the invention may employ vanadium as an essential ingredient, and contain at least one kind selected from magnesium, rare earth element and manganese as other ingredient. In this case, a part or all of these are preferably contained within the crystal grains.

The Curie temperature in the present invention refers to the temperature at which relative dielectric constant becomes a maximum in the measuring range (−60 to 150° C.) of the temperature characteristics of relative dielectric constant.

The method of manufacturing the dielectric ceramics of the invention will now be described.

Firstly, $BaCO_3$ powder, $TiO_2$ powder and $V_2O_5$ powder, each having a purity of 99% or above, are prepared as raw material powders. The $BaCO_3$ powder and the $TiO_2$ powder are adjusted to have such a composition that Ti falls within the range of 0.98 to 1 mole with respect to 1 mole of Ba contained in the $BaCO_3$ powder. The $V_2O_5$ powder is blended in an amount of 0.0005 to 0.03 moles with respect to 1 mole of Ba contained in the $BaCO_3$ powder.

When MgO powder, oxide powder of rare earth element and $MnCO_3$ powder are added as additives, these additives powders are mixed together with the $BaCO_3$ powder, the $TiO_2$ powder and the $V_2O_5$ powder so that the proportion of the MgO powder is not more than 0.03 moles, and the proportion of the oxide powder of rare earth element is not more than 0.06 moles, and the proportion of the $MnCO_3$ powder is not more than 0.007 moles, with respect to 1 mole of Ba contained in the $BaCO_3$ powder.

After the mixture of these raw material powders is wet-mixed and dried, this is calcined at a temperature of 900 to 1200° C., and then ground. When the calcination temperature of 900° C. or above, there is the advantage of being able to enhance the solid solution of vanadium into the calcined powder composed mainly of barium titanate. On the other hand, when the calcination temperature is 1200° C. or below, there is the advantage of being able to inhibit abnormal grain growth of the calcined powder thereby to obtain the calcined powder having high reactivity.

Thereafter, the calcined powder is formed into a pellet shape, and fired at normal pressure in a reduction atmosphere in a temperature range of 1100° C. to 1500° C., thereby obtaining the dielectric ceramics of the invention. The firing temperature of 1100° C. or above produces the advantage of being able to densify the dielectric ceramics. On the other hand, the firing temperature of 1500° C. or below produces the advantage of being able to inhibit abnormal grain growth of the crystal grains thereby to also permit densification.

Figure 3:
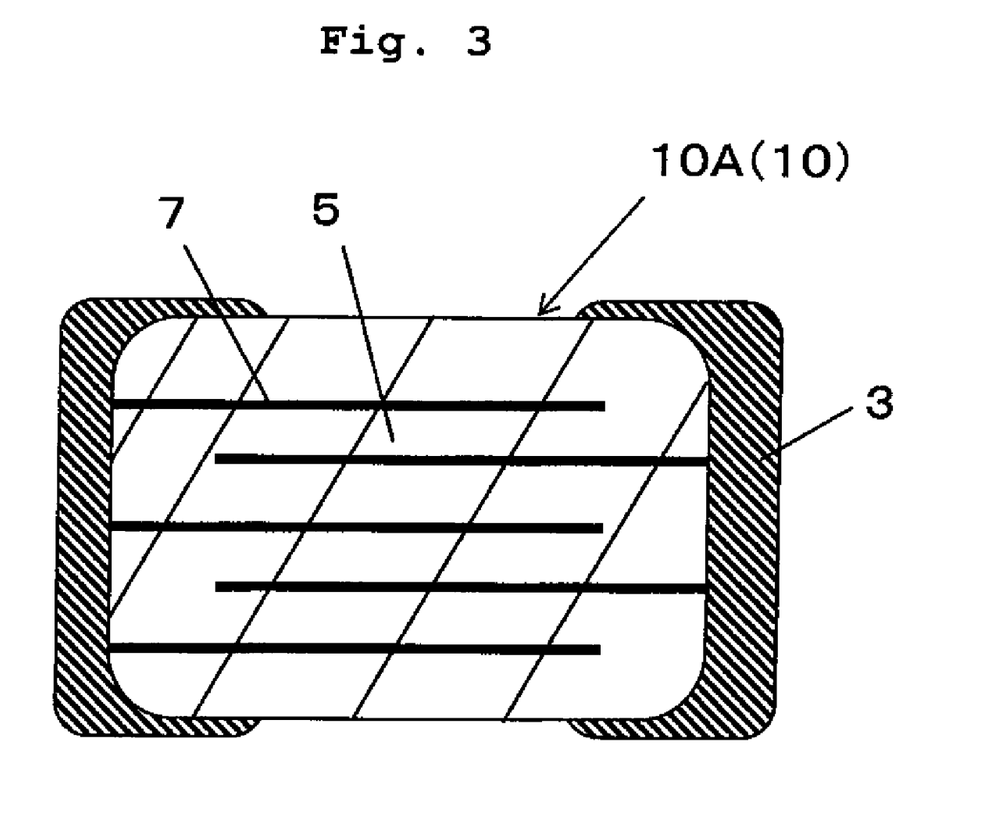
FIG. 3 is a sectional schematic diagram showing an example of the multilayer ceramic capacitor of the invention.

FIG. 3 is a sectional schematic diagram showing an example of the multilayer ceramic capacitor of the invention. The multilayer ceramic capacitor of the invention is one in which external electrodes 3 are installed on both ends of a capacitor body 10, respectively. The capacitor body 10 is constructed from a laminate 10A in which dielectric layers 5 and inner electrode layers 7 are alternately laminated. It is important that the dielectric layers 5 are formed by the above dielectric ceramics of the invention. Although the laminated state of the dielectric layers 5 and the inner electrode layers 7 is shown in simplified form in FIG. 3, the multilayer ceramic capacitor of the invention is the laminate made up of the dielectric layers 5 and the inner electrode layers 7, the number of each layer exceeding several hundreds.

In accordance with the above multilayer ceramic capacitor of the invention, by applying the above dielectric ceramics to the dielectric layers 5, high insulation properties is ensured even if the dielectric layers 5 are made thinner, thus achieving the multilayer ceramic capacitor having excellent life characteristics in the high temperature load test, and exhibiting high dielectric constant even at high temperature.

The dielectric ceramics of the invention has the small voltage dependence of insulation resistance, and hence is suitable for the multilayer ceramic capacitor provided with the dielectric layers 5 having a layer thickness as small as not more than 2 μm, particularly not more than 1 μm.

From the viewpoint that manufacturing cost can be reduced in spite of being highly laminated, the inner electrodes layers 7 are preferably base metal, such as nickel (Ni) and copper (Cu), more preferably nickel (Ni) that permits simultaneous firing with the dielectric layers 5.

The external electrodes 3 are formed by baking Cu, or an alloy paste of Cu and Ni.

Next, the method of manufacturing the multilayer ceramic capacitor will be described below. Ceramic slurry is blended by adding organic vehicles containing polyvinyl butyral and toluene into the above raw material powders. The ceramic slurry is then formed into a ceramic green sheet by using a sheet forming method such as doctor blade method, die coater, or the like. In this case, the thickness of the ceramic green sheet is preferably 1 to 4 μm, from the viewpoint of thinning for high capacity and maintaining high insulation properties of the dielectric layers 5.

A rectangular inner electrode pattern is formed by printing on a main surface of the obtained ceramic green sheet. As a conductor paste that becomes the inner electrode pattern, Ni, Cu, or alloy powder of these is suitable. A sheet laminate is formed by stacking a desired number of the ceramic green sheets with the inner electrode pattern formed thereon, and by stacking on the upper and lower sides thereof a plurality of the ceramic green sheets without the inner electrode pattern so that the upper and lower layers have the same number of layers. In this case, the inner electrode patterns within the sheet laminate are shifted by one-half the pattern in the longitudinal direction thereof.

Subsequently, a capacitor body formed body is formed so that the ends of the inner electrode patterns are exposed by cutting the sheet laminate in a lattice shape. This laminating method enables the inner electrode patterns to be formed alternately exposed to the end faces of the capacitor body formed body after cutting. A capacitor body is manufactured by degreasing the capacitor body formed body, followed by heat treatment under the same firing conditions as in the above dielectric ceramics, and in a weak reduction atmosphere. External electrodes are formed by applying external electrode paste to the opposed ends of the capacitor body, followed by baking. In order to enhance packaging performance, a plating film may be formed on the surfaces of these external electrodes.

Second Preferred Embodiment

The dielectric ceramics of the present preferred embodiment contains 0.0005 to 0.003 moles of vanadium in terms of $V_2O_5$, 0 to 0.001 moles of magnesium in terms of MgO, 0 to 0.005 moles of manganese in terms of MnO, and 0.004 to 0.015 moles of one kind of rare earth element (RE) selected from yttrium, dysprosium, holmium and erbium in terms of $RE_2O_3$, with respect to 1 mole of barium constituting barium titanate. In the X-ray diffraction chart of the dielectric ceramics, the diffraction intensity of the (004) plane indicating the tetragonal system barium titanate is larger than the diffraction intensity of the (400) plane indicating the cubic system barium titanate. This provides the dielectric ceramics in which relative dielectric constant can be increased above 2800; the temperature change of the relative dielectric constant satisfies the X7R characteristic of EIA standard; the insulation resistances becomes above $10^8 \Omega$ when DC voltage values applied per unit thickness (1 μm) are 3.15 V and 12.5 V, respectively; and little or no insulation resistance drop takes place.

The average crystal grain diameter of the crystal grains 1 is preferably 0.2 to 0.4 μm, particularly 0.26 to 0.37 μm. This ensures high insulation properties even if the dielectric ceramics is made thinner and applied to dielectric layers of the multilayer ceramic capacitor, and also achieves a higher capacity, so that the temperature dependence of relative dielectric constant can be minimized, and dielectric loss can be reduced below 23%.

Here, the average crystal grain diameter of the crystal grains 1 is determined as follows. An image of a polished surface of the cross section of the dielectric ceramics subjected to cross section polishing, which is produced on a transmission electron microscope, is transferred into a computer, and a diagonal line is drawn on the monitor thereof. The contours of crystal grains existing on the diagonal line are subjected to image processing, thereby obtaining the areas of the individual grains. The diameters of these grains when they are replaced with a circle having the same area are calculated, and the average value of the diameters of about 50 crystal grains thus calculated is employed as the average crystal grain diameter.

As described above, the dielectric ceramics of the second preferred embodiment employs barium titanate as a main ingredient, and contains 0.0005 to 0.003 moles of vanadium in terms of $V_2O_5$, 0 to 0.001 moles of magnesium in terms of MgO, 0 to 0.005 moles of manganese in terms of MnO, and 0.004 to 0.015 moles of one kind of rare earth element (RE) selected from yttrium, dysprosium, holmium and erbium in terms of $RE_2O_3$, with respect to 1 mole of barium constituting the barium titanate.

As a preferred composition, the dielectric ceramics employs barium titanate as a main ingredient, and contains 0.0005 to 0.003 moles of vanadium in terms of $V_2O_5$, not more than 0.005 moles of manganese in terms of MnO, and 0.004 to 0.015 moles of one kind of rare earth element (RE) selected from yttrium, dysprosium, holmium and erbium in terms of $RE_2O_3$, with respect to 1 mole of barium constituting the barium titanate. The content of magnesium is preferably zero mole in terms of MgO.

The above composition of the dielectric ceramics achieves the dielectric ceramics having high insulation properties, exhibiting a tendency that insulation resistance increases (a positive change) between 3.15 V and 12.5 V, which are DC voltages applied per unit thickness (1 μm) of the dielectric layer.

As other preferred composition, the dielectric ceramics contains 0.0005 to 0.003 moles of vanadium in terms of $V_2O_5$, and 0.004 to 0.015 moles of one kind of rare earth element (RE) selected from yttrium, dysprosium, holmium and erbium in terms of $RE_2O_3$, with respect to 1 mole of barium constituting barium titanate. The content of magnesium is preferably zero mole in terms of MgO, and the content of manganese is preferably zero mole in terms of MnO. This composition further reduces the dielectric loss of the dielectric ceramics. This composition also achieves the dielectric ceramics having excellent high temperature load life even if only manganese is set to zero mole.

Among the rare earth elements (RE), yttrium, dysprosium, holmium and erbium are less liable to generate a different phase when they are dissolved in barium titanate to form a solid solution, thereby obtaining high insulation properties. Yttrium is preferred because it can increase the relative dielectric constant of the dielectric ceramics.

Here, the description that the content of magnesium is zero mole and the content of manganese is zero mole with respect to 1 mole of barium constituting barium titanate means that the dielectric ceramics does not substantially contain magnesium and manganese, and their amounts are below detection limits in ICP atomic emission spectrometry (below 0.5 μg/g).

Alternatively, terbium may be contained in the range below 0.003 moles in terms of $Tb_4O_7$ with respect to 1 mole of barium constituting barium titanate. When terbium is contained in a predetermined proportion, the insulation resistance of the dielectric ceramics can be enhanced. Therefore, when this dielectric ceramics is applied to the dielectric layers of the multilayer ceramic capacitor, the life characteristics in the high temperature load test can be further improved. If the content of terbium is greater than 0.003 moles in terms of $Tb_4O_7$, the relative dielectric constant of the dielectric ceramics will drop. Hence, the above composition range is suitable.

More preferably, in the dielectric ceramics of the second preferred embodiment, in the X-ray diffraction chart, the diffraction intensity of the (004) plane indicating the tetragonal system barium titanate is larger than the diffraction intensity of the (400) plane indicating the cubic system barium titanate.

The following is a detailed description of the crystal structure of the dielectric ceramics of the second preferred embodiment. The dielectric ceramics of the second preferred embodiment is also occupied by a crystal phase close to a haploid phase, almost all of which show tetragonal system even if vanadium is dissolved into the crystal grains 1 to form a solid solution, as the above X-ray diffraction chart shown in FIG. 2(a).

That is, in the dielectric ceramics composed mainly of barium titanate and constructed from crystal grains having the core-shell structure, the diffraction intensity of the (400) plane (the (040) plane and the (400) plane are overlapped with each other) indicating the cubic system of barium titanate appearing between the (004) plane and the (400) plane indicating the tetragonal system of barium titanate is larger than the diffraction intensity of the (004) plane indicating the tetragonal system of barium titanate.

The above dielectric ceramics is manufactured by forming one in which oxide powder such as magnesium, rare earth element and the like are added and mixed into powder composed mainly of barium titanate, followed by reduction firing. Hereat, the crystal grains having the core-shell structure has a small amount of solid solution of ingredients such as the magnesium and the rare earth element in the core part, and hence the interior of the crystal grains has a large number of defects such as oxygen vacancies. It is therefore considered that upon the application of DC voltage, the oxygen vacancies are liable to become carriers transferring charge in the interior of the crystal grains, thereby deteriorating the insulation properties of the dielectric ceramics.

On the contrary, in the dielectric ceramics of the second preferred embodiment, in the X-ray diffraction chart of the dielectric ceramics, the diffraction intensity of the (004) plane indicating the tetragonal system of barium titanate is larger than the diffraction intensity of the (400) plane indicating the cubic system of barium titanate, as shown in FIG. 2(a).

That is, in the dielectric ceramics of the second preferred embodiment, the X-ray diffraction peaks of the (004) plane (2θ=around 100°) and the (400) plane (2θ=around 101°) indicating the tetragonal system of barium titanate appear clearly as shown in FIG. 2(a), and the diffraction intensity of the (400) plane indicating the cubic system of barium titanate appearing between the (004) plane and the (400) plane indicating the tetragonal system of barium titanate is smaller than the diffraction intensity of the (004) plane indicating the tetragonal system of barium titanate.

Especially, in the dielectric ceramics of the second preferred embodiment, the Ixt/Ixc ratio is preferably 1.4 to 2, where Ixt is the diffraction intensity of the (004) plane indicating the tetragonal system of barium titanate, and Ixc is the diffraction intensity of the (400) plane indicating the cubic system of barium titanate. When the Ixt/Ixc ratio is 1.4 to 2, the ratio of the crystal phase of tetragonal system is increased, and the change rate of insulation resistance can be further decreased, enabling to enhance the life characteristics in the high temperature load test.

The above dielectric ceramics of the second preferred embodiment becomes a nearly uniform crystal phase of tetragonal system even if it contains vanadium. Hence, the vanadium and other additive ingredients are dissolved throughout these crystal grains to form a solid solution. It is therefore considered that the generation of defects such as oxygen vacancies in the interior of the crystal grains is suppressed thereby to decrease the carriers transferring charge, enabling to suppress deterioration of the insulation properties of the dielectric ceramics during the DC voltage application.

That is, the oxygen vacancies in the dielectric ceramics of the second preferred embodiment are electrically neutralized by the fact that vanadium atoms at titanium sites to form a substitutional solid solution are chargedly coupled with the oxygen vacancies to thereby generate a pair of defects. It is therefore considered that the contribution to conduction by electric field application can be decreased and hence the mobility thereof is lowered even in the presence of oxygen vacancies, thereby inhibiting the insulation resistance drop in the high temperature load test.

In the dielectric ceramics of the second preferred embodiment, as additive for enhancing sintering properties, not more than 3% by mass of glass ingredient may be contained in the dielectric ceramics as long as the desired dielectric properties can be retained.

The method of manufacturing the dielectric ceramics of the second preferred embodiment will now be described. Firstly, barium titanate powder (hereinafter referred to as BT powder) having a purity of 99% or above is prepared as raw material powder. As additive ingredients, $V_2O_5$ powder and MgO powder, and further oxide powder of one kind of a first rare earth element (RE) selected from $Y_2O_3$ powder, $Dy_2O_3$ powder, $Ho_2O_3$ powder and $Er_2O_3$ powder, and $MnCO_3$ powder are prepared. When terbium is contained, $Tb_4O_7$ powder is used as the oxide of a second rare earth element (RE).

The average grain diameter of the BT powder is preferably 0.05 to 0.15 μm. When the average grain diameter of the BT powder is larger than 0.05 μm, there is the advantage of being able to improve relative dielectric constant because the crystal grains 1 have high crystillinity.

On the other hand, when the average grain diameter of the BT powder is less than 0.15 μm, it is easy to dissolve the additives such as magnesium, the rare earth element (RE) and manganese into the interior of the crystal grains 1 to form a solid solution. Additionally, as will be described later, there is the advantage of being able to increase the ratio of grain growth from the BT powder to the crystal grains 1.

Preferably, the oxide powder of the first rare earth element (RE) of one kind selected from the $Y_2O_3$ powder, the $Dy_2O_3$ powder, the $Ho_2O_3$ powder, the $Er_2O_3$ powder, the $Tb_4O_7$ powder, the $V_2O_5$ powder, the MgO powder and the $MnCO_3$ powder, which are the above additives, have an average grain diameter similar to or lower than that of the BT powder. The use of these additives is suitable for enhancing dispersibility.

These raw material powders are then blended to 1 mole of barium constituting the BT powder as follows: 0.0005 to 0.003 moles of the $V_2O_5$ powder; 0 to 0.001 moles of the MgO powder; 0 to 0.005 moles of the $MnCO_3$ powder; and 0.004 to 0.015 moles of one kind of the first rare earth element (RE) selected from the $Y_2O_3$ powder, the $Dy_2O_3$ powder, the $Ho_2O_3$ powder and the $Er_2O_3$ powder. This is formed into a desired shape, and the obtained formed body is degreased and thereafter fired in a reduced atmosphere.

In the manufacture of the dielectric ceramics of the invention, as sintering additive, glass powder may be added as long as the desired dielectric properties can be retained. The amount of addition thereof is preferably 0.5 to 2 parts by mass, based on 100 parts by mass of the total amount of the BT powder as the main raw material powder.

The firing temperature depends on whether or not the sintering additive such as glass powder is used, however, the range of 1050 to 1200° C. is suitable for controlling the dissolution of the additives into the BT powder to form a solid solution, and the grain growth of the crystal grains.

In order to obtain the above dielectric ceramics, fine-grain BT powder is used, and the above-mentioned additives are added thereto in their respective predetermined amounts, followed by firing at the above-mentioned temperature, so that the average grain diameter of the BT powder containing these various kinds of additives after firing becomes two or more times that before firing. It is considered that, by firing so that the average grain diameter of the crystal grains after firing is two or more times the average grain diameter of the BT powder containing vanadium and other additives, the vanadium and other additive ingredients are dissolved throughout the crystal grains 1 to form a solid solution, and consequently the generation of defects such as oxygen vacancies is suppressed in the interior of the crystal grains, resulting in the state in which there are few carriers transferring charge.

After the firing, another heat treatment is carried out in a weak reduction atmosphere. This heat treatment is for reoxidizing the dielectric ceramics reduced in the firing in the reduced atmosphere, thereby recovering the insulation resistance lowered by the reduction during the firing. The temperature thereof is preferably 900 to 1100° C. because the amount of reoxidization is increased while suppressing a further grain growth of the crystal grains 1. Thus, it is capable of manufacturing the dielectric ceramics constructed from the crystal grains exhibiting high insulation properties within the crystal grains 1.

A multilayer ceramic capacitor similar to that described in the first preferred embodiment and shown in FIG. 3 can be obtained by using the above dielectric ceramics as dielectric layers.

In accordance with the multilayer ceramic capacitor of the present preferred embodiment, by applying the above dielectric ceramics as the dielectric layers 5, a high dielectric constant is achieved and the temperature change of relative dielectric constant satisfies the X7R characteristic of EIA standard. Even if the dielectric layers 5 are made thinner, high insulation properties is ensured, achieving the multilayer ceramic capacitor having excellent life characteristics in the high temperature load test.

The thickness of the dielectric layers 5 is preferably not more than 3 μm, particularly not more than 2.5 μm, in order to obtain the compact high-capacity multilayer ceramic capacitor. In the present invention, the thickness of the dielectric layer 5 is more preferably not less than 1 μm in order to stabilize fluctuations of electrostatic capacity and capacity temperature characteristics.

From the viewpoint that manufacturing cost can be reduced in spite of being highly laminated, the inner electrodes layers 7 are preferably base metal, such as nickel (Ni) and copper (Cu), more preferably nickel (Ni) that permits simultaneous firing with the dielectric layers 5.

The external electrodes 4 are formed by baking Cu, or an alloy paste of Cu and Ni.

Next, the method of manufacturing the multilayer ceramic capacitor will be described below. Ceramic slurry is blended by adding specialized organic vehicles into the above raw material powders. The ceramic slurry is formed into a ceramic green sheet by using a sheet forming method such as doctor blade method, die coater, or the like. In this case, the thickness of the ceramic green sheet is preferably 1 to 4 μm, from the viewpoint of thinning for high capacity and maintaining high insulation properties of the dielectric layers.

Subsequently, a rectangular inner electrode pattern is formed by printing on a main surface of the obtained ceramic green sheet. As a conductor paste that becomes the inner electrode pattern, Ni, Cu, or alloy powder of these is suitable.

A sheet laminate is formed by stacking a desired number of the ceramic green sheets with the inner electrode pattern formed thereon, and by stacking on the upper and lower sides thereof a plurality of the ceramic green sheets without the inner electrode pattern so that the upper and lower layers have the same number of layers. In this case, the inner electrode patterns within the sheet laminate are shifted by one-half the pattern in the longitudinal direction thereof.

Subsequently, a capacitor body formed body is formed so that the ends of the inner electrode patterns are exposed by cutting the sheet laminate in a lattice shape. This laminating method enables the inner electrode patterns to be formed alternately exposed to the end faces of the capacitor body formed body after cutting.

A capacitor body is manufactured by degreasing the capacitor body formed body, followed by heat treatment under the same firing conditions as in the dielectric ceramics, and in a weak reduction atmosphere. External electrodes 3 are formed by applying external electrode paste to the opposed ends of the capacitor body, followed by baking. In order to enhance packaging performance, a plating film may be formed on the surfaces of these external electrodes 3.

Examples of the present invention will be described below. It is understood that the present invention is not limited to the following examples.

Example I

The dielectric ceramics was manufactured as follows. Firstly, $BaCO_3$ powder, $TiO_2$ powder, $V_2O_5$ powder, MgO powder, $Y_2O_3$ powder, $Dy_2O_3$ powder, $Ho_2O_3$ powder, $Er_2O_3$ powder and $MnCO_3$ powder, each having a purity of 99.9%, were prepared and blended in the proportions shown in Table 1, thereby obtaining a mixed powder. The amounts shown in Tables 1 and 2 correspond to the amounts of the above elements in terms of the oxides thereof.

The mixed powder was calcined at a temperature of 1000° C., and the calcined powder was ground. Thereafter, the mixed powder was granulated and formed into a pellet shape having a diameter of 16.5 mm and a thickness of 0.7 mm. The pellets of their respective compositions were fired at 1300° C. in hydrogen-nitrogen atmosphere. The manufactured samples were evaluated as follows.

Firstly, the crystal phase was identified by using the X-ray diffraction (2θ=99 to 102°, Cu—Kα). Then, the diffraction intensity (Ixt) of the (004) plane indicating the tetragonal system of barium titanate, and the diffraction intensity (Ixc) of the (400) plane indicating the cubic system were determined.

These fired samples were then evaluated for relative dielectric constant, Curie temperature and insulation resistance. Firstly, a conductor layer of indium gallium was printed on the entire surfaces of the fired pellets. Using an LCR meter 4284A, the electrostatic capacity of each of these samples as the manufactured dielectric ceramics was measured at a temperature of 85° C., a frequency of 1.0 kHz and an input signal level of 1.0 V, and the relative dielectric constant was calculated from the diameter and thickness of each sample and the area of the conductor layer.

The electrostatic capacity of each sample was measured in the range of –60 to 150° C., and the Curie temperature was set to a temperature at which the electrostatic capacity became the maximum.

The insulation resistance was measured at 85° C. under conditions of 0.1 V/μm and 2.5 V/μm, respectively. The change rate of the insulation resistance was determined from the ratio of the measured value under the condition of 2.5 V/μm to the measured value under the condition of 0.1 V/μm. The voltage dependence of the insulation resistance was evaluated based on the results.

The composition analysis of each sample was performed by ICP analysis or atomic absorption spectrometry. Specifically, the substance made by mixing and melting the obtained dielectric ceramics with boron and sodium carbonate was dissolved in hydrochloric acid. Firstly, the qualitative analysis of the elements contained in the dielectric ceramics was carried out by atomic absorption spectrometry, and then the specified individual elements were quantified by subjecting them to ICP emission spectrochemical analysis using a solution obtained by diluting a standard solution as a standard sample. The amount of oxygen was determined by converting the valence of each element to a valence according to the group shown in the period table.

The formulated compositions and the firing temperature are shown in Table 1. The compositions of the individual elements in terms of the oxides thereof in the sintered body are shown in Table 2. The results of the characteristics were shown in Table 3.

TABLE 1

| Sample No. | Main components | | Composition of additives | | | |
|---|---|---|---|---|---|---|
| | $BaCO_3$ mole | $TiO_2$ mole | $V_2O_5$ mole | MgO mole | $RE_2O_3$ RE | $RE_2O_3$ mole | $MnCO_3$ mole |
| *I-1 | 1 | 0.985 | 0 | 0 | — | 0 | 0 |
| I-2 | 1 | 0.985 | 0.0005 | 0 | — | 0 | 0 |
| I-3 | 1 | 0.985 | 0.001 | 0 | — | 0 | 0 |
| I-4 | 1 | 0.985 | 0.003 | 0 | — | 0 | 0 |
| I-5 | 1 | 0.985 | 0.02 | 0 | — | 0 | 0 |
| I-6 | 1 | 0.985 | 0.03 | 0 | — | 0 | 0 |
| *I-7 | 1 | 0.985 | 0.04 | 0 | — | 0 | 0 |
| I-8 | 1 | 0.985 | 0.003 | 0.01 | — | 0 | 0 |
| I-9 | 1 | 0.985 | 0.003 | 0.02 | — | 0 | 0 |
| I-10 | 1 | 0.985 | 0.003 | 0.03 | — | 0 | 0 |
| I-11 | 1 | 0.985 | 0.003 | 0 | $Y_2O_3$ | 0.01 | 0 |
| I-12 | 1 | 0.985 | 0.003 | 0 | $Y_2O_3$ | 0.03 | 0 |
| I-13 | 1 | 0.985 | 0.003 | 0 | $Y_2O_3$ | 0.06 | 0 |
| I-14 | 1 | 0.985 | 0.003 | 0 | $Y_2O_3$ | 0.07 | 0 |
| I-15 | 1 | 0.985 | 0.003 | 0 | — | 0 | 0.003 |
| I-16 | 1 | 0.985 | 0.003 | 0 | — | 0 | 0.007 |
| I-17 | 1 | 0.985 | 0.003 | 0 | — | 0 | 0.01 |
| *I-18 | 1 | 0.985 | 0 | 0.01 | $Y_2O_3$ | 0.03 | 0.003 |
| I-19 | 1 | 0.985 | 0.001 | 0.01 | $Y_2O_3$ | 0.03 | 0.003 |
| I-20 | 1 | 0.985 | 0.003 | 0.01 | $Y_2O_3$ | 0.03 | 0.003 |
| I-21 | 1 | 0.985 | 0.02 | 0.01 | $Y_2O_3$ | 0.03 | 0.003 |
| I-22 | 1 | 0.985 | 0.03 | 0.01 | $Y_2O_3$ | 0.03 | 0.003 |
| *I-23 | 1 | 0.985 | 0.04 | 0.01 | $Y_2O_3$ | 0.03 | 0.003 |
| I-24 | 1 | 0.985 | 0.003 | 0.01 | — | 0 | 0.003 |
| I-25 | 1 | 0.985 | 0.003 | 0.01 | $Y_2O_3$ | 0.06 | 0.003 |
| I-26 | 1 | 0.985 | 0.003 | 0.01 | $Y_2O_3$ | 0.07 | 0.003 |
| I-27 | 1 | 0.985 | 0.003 | 0.01 | $Y_2O_3$ | 0.03 | 0 |
| I-28 | 1 | 0.985 | 0.003 | 0.01 | $Y_2O_3$ | 0.03 | 0.007 |
| I-29 | 1 | 0.985 | 0.003 | 0.01 | $Y_2O_3$ | 0.03 | 0.01 |
| I-30 | 1 | 0.985 | 0.003 | 0 | $Y_2O_3$ | 0.03 | 0.003 |
| I-31 | 1 | 0.985 | 0.003 | 0.02 | $Y_2O_3$ | 0.03 | 0.003 |
| I-32 | 1 | 0.985 | 0.003 | 0.03 | $Y_2O_3$ | 0.03 | 0.003 |
| I-33 | 1 | 0.985 | 0.003 | 0 | $Dy_2O_3$ | 0.03 | 0 |
| I-34 | 1 | 0.985 | 0.003 | 0 | $Ho_2O_3$ | 0.03 | 0 |
| I-35 | 1 | 0.985 | 0.003 | 0 | $Er_2O_3$ | 0.03 | 0 |
| *I-36 | 1 mole of $BaTiO_3$** | | 0 | 0.01 | $Y_2O_3$ | 0.03 | 0.003 |
| *I-37 | 1 mole of $BaTiO_3$** | | 0.003 | 0.01 | $Y_2O_3$ | 0.03 | 0.003 |

The samples marked "*" are out of the scope of the present invention.
**Synthesized $BaTiO_3$ powder was used as raw material powders.

TABLE 2

| Sample No. | Composition of components | | | | | | |
|---|---|---|---|---|---|---|---|
| | Ba mole | $TiO_2$ mole | $V_2O_5$ mole | MgO mole | $RE_2O_3$ RE | $RE_2O_3$ mole | MnO mole |
| *I-1 | 1 | 0.985 | 0 | 0 | — | 0 | 0 |
| I-2 | 1 | 0.985 | 0.0005 | 0 | — | 0 | 0 |
| I-3 | 1 | 0.985 | 0.001 | 0 | — | 0 | 0 |
| I-4 | 1 | 0.985 | 0.003 | 0 | — | 0 | 0 |
| I-5 | 1 | 0.985 | 0.02 | 0 | — | 0 | 0 |
| I-6 | 1 | 0.985 | 0.03 | 0 | — | 0 | 0 |
| *I-7 | 1 | 0.985 | 0.04 | 0 | — | 0 | 0 |
| I-8 | 1 | 0.985 | 0.003 | 0.01 | — | 0 | 0 |
| I-9 | 1 | 0.985 | 0.003 | 0.02 | — | 0 | 0 |
| I-10 | 1 | 0.985 | 0.003 | 0.03 | — | 0 | 0 |
| I-11 | 1 | 0.985 | 0.003 | 0 | $Y_2O_3$ | 0.01 | 0 |
| I-12 | 1 | 0.985 | 0.003 | 0 | $Y_2O_3$ | 0.03 | 0 |
| I-13 | 1 | 0.985 | 0.003 | 0 | $Y_2O_3$ | 0.06 | 0 |
| I-14 | 1 | 0.985 | 0.003 | 0 | $Y_2O_3$ | 0.07 | 0 |
| I-15 | 1 | 0.985 | 0.003 | 0 | — | 0 | 0.003 |
| I-16 | 1 | 0.985 | 0.003 | 0 | — | 0 | 0.007 |
| I-17 | 1 | 0.985 | 0.003 | 0 | — | 0 | 0.01 |
| *I-18 | 1 | 0.985 | 0 | 0.01 | $Y_2O_3$ | 0.03 | 0.003 |
| I-19 | 1 | 0.985 | 0.001 | 0.01 | $Y_2O_3$ | 0.03 | 0.003 |
| I-20 | 1 | 0.985 | 0.003 | 0.01 | $Y_2O_3$ | 0.03 | 0.003 |
| I-21 | 1 | 0.985 | 0.02 | 0.01 | $Y_2O_3$ | 0.03 | 0.003 |
| I-22 | 1 | 0.985 | 0.03 | 0.01 | $Y_2O_3$ | 0.03 | 0.003 |
| *I-23 | 1 | 0.985 | 0.04 | 0.01 | $Y_2O_3$ | 0.03 | 0.003 |

TABLE 2-continued

| Sample No. | Ba mole | TiO$_2$ mole | V$_2$O$_5$ mole | MgO mole | RE$_2$O$_3$ RE | RE$_2$O$_3$ mole | MnO mole |
|---|---|---|---|---|---|---|---|
| I-24 | 1 | 0.985 | 0.003 | 0.01 | — | — | 0.003 |
| I-25 | 1 | 0.985 | 0.003 | 0.01 | Y$_2$O$_3$ | 0.06 | 0.003 |
| I-26 | 1 | 0.985 | 0.003 | 0.01 | Y$_2$O$_3$ | 0.07 | 0.003 |
| I-27 | 1 | 0.985 | 0.003 | 0.01 | Y$_2$O$_3$ | 0.03 | 0 |
| I-28 | 1 | 0.985 | 0.003 | 0.01 | Y$_2$O$_3$ | 0.03 | 0.007 |
| I-29 | 1 | 0.985 | 0.003 | 0.01 | Y$_2$O$_3$ | 0.03 | 0.01 |
| I-30 | 1 | 0.985 | 0.003 | 0 | Y$_2$O$_3$ | 0.03 | 0.003 |
| I-31 | 1 | 0.985 | 0.003 | 0.02 | Y$_2$O$_3$ | 0.03 | 0.003 |
| I-32 | 1 | 0.985 | 0.003 | 0.03 | Y$_2$O$_3$ | 0.03 | 0.003 |
| I-33 | 1 | 0.985 | 0.003 | 0 | Dy$_2$O$_3$ | 0.03 | 0 |
| I-34 | 1 | 0.985 | 0.003 | 0 | Ho$_2$O$_3$ | 0.03 | 0 |
| I-35 | 1 | 0.985 | 0.003 | 0 | Er$_2$O$_3$ | 0.03 | 0 |
| *I-36 | 1 | 0.985 | 0 | 0.01 | Y$_2$O$_3$ | 0.03 | 0.003 |
| *I-37 | 1 | 0.985 | 0.003 | 0.01 | Y$_2$O$_3$ | 0.03 | 0.003 |

The samples marked "*" are out of the scope of the present invention.

TABLE 3

| Sample No. | Comparison of intensity of X-ray diffraction chart** | Insulation resistance 0.1 V/μm Ω | Insulation resistance 2.5 V/μm Ω | Change rate※ % | Curie point °C. | Relative dielectric constant 85° C. |
|---|---|---|---|---|---|---|
| *I-1 | 5 | 1.82E+08 | 7.28E+06 | 96 | 125 | 1900 |
| I-2 | 3.2 | 9.00E+07 | 6.30E+07 | 30 | 120 | 2140 |
| I-3 | 3.1 | 8.79E+07 | 8.44E+07 | 4 | 118 | 2140 |
| I-4 | 2.8 | 1.03E+07 | 9.87E+06 | 4.2 | 118 | 2080 |
| I-5 | 2.8 | 6.78E+05 | 6.58E+05 | 3 | 115 | 2360 |
| I-6 | 2.8 | 3.21E+04 | 3.18E+04 | 1 | 110 | 2820 |
| *I-7 | 2.8 | 6.83E+03 | 6.69E+03 | 2 | 120 | 2210 |
| I-8 | 2.7 | 1.05E+07 | 9.86E+06 | 6.1 | 85 | 7700 |
| I-9 | 2.7 | 1.10E+07 | 1.05E+07 | 5 | 65 | 3990 |
| I-10 | 2.7 | 1.20E+07 | 1.13E+07 | 6 | 30 | 2020 |
| I-11 | 2.7 | 2.40E+07 | 2.28E+07 | 5 | 115 | 2320 |
| I-12 | 2.7 | 2.50E+07 | 2.40E+07 | 4 | 110 | 2840 |
| I-13 | 2.7 | 4.08E+07 | 3.55E+07 | 13 | 100 | 3380 |
| I-14 | 1.8 | 7.66E+07 | 5.97E+07 | 22 | 95 | 4440 |
| I-15 | 2.7 | 4.12E+07 | 3.83E+07 | 7 | 115 | 2380 |
| I-16 | 2.7 | 7.66E+07 | 6.51E+07 | 15 | 110 | 2630 |
| I-17 | 1.8 | 8.11E+07 | 5.92E+07 | 27 | 110 | 2630 |
| *I-18 | 0.9 | 2.26E+08 | 1.36E+07 | 94 | 75 | 4520 |
| I-19 | 2.2 | 1.16E+08 | 1.10E+08 | 5 | 75 | 4900 |
| I-20 | 2.2 | 5.95E+07 | 5.65E+07 | 5 | 75 | 4830 |
| I-21 | 2.2 | 1.03E+06 | 9.89E+05 | 4 | 70 | 3670 |
| I-22 | 2.2 | 6.59E+04 | 6.52E+04 | 1 | 65 | 3860 |
| *I-23 | 1.4 | 8.94E+03 | 8.85E+03 | 1 | 50 | 3040 |
| I-24 | 2.6 | 4.45E+07 | 4.27E+07 | 4 | 76 | 4030 |
| I-25 | 2.4 | 5.31E+07 | 4.51E+07 | 15 | 50 | 3320 |
| I-26 | 1.6 | 8.93E+07 | 6.52E+07 | 27 | 60 | 2810 |
| I-27 | 2.7 | 3.81E+07 | 3.70E+07 | 3 | 65 | 3780 |
| I-28 | 2.2 | 8.02E+07 | 6.58E+07 | 18 | 60 | 3710 |
| I-29 | 1.6 | 9.24E+07 | 6.56E+07 | 29 | 60 | 2640 |
| I-30 | 2.6 | 5.86E+07 | 5.68E+07 | 3 | 115 | 2450 |
| I-31 | 2.2 | 6.02E+07 | 5.60E+07 | 7 | 60 | 4660 |
| I-32 | 2.2 | 6.11E+07 | 5.62E+07 | 8 | 30 | 2010 |
| I-33 | 2.7 | 2.49E+07 | 2.39E+07 | 4 | 110 | 2820 |
| I-34 | 2.7 | 2.49E+07 | 2.39E+07 | 4 | 110 | 2820 |
| I-35 | 2.7 | 2.49E+07 | 2.39E+07 | 4 | 110 | 2820 |
| *I-36 | 0.25 | 7.05E+07 | 2.12E+06 | 97 | 125 | 1890 |
| *I-37 | 0.25 | 2.18E+06 | 1.05E+06 | 52 | 125 | 1760 |

The samples marked "*" are out of the scope of the present invention.
**; Ixt/Ixc ratio, where Ixt is diffraction intensity of (004) plane indicating tetragonal system, and Ixc is diffraction intensity of (400) plane indicating cubic system Ixt/Ixc ratio is more than 1, when diffraction intensity of (004) plane indicating tetragonal system is larger than diffraction intensity of (400) plane indicating cubic system. Ixt/Ixc ratio is less than 1, when diffraction intensity of (004) plane indicating tetragonal system is smaller than diffraction intensity of (400) plane indicating cubic system.
※(Insulation resistance at 2.5 V/μm/Insulation resistance at voltage of 0.1 V/μm) × 100

As apparent from the results of Tables 1 to 3, in Samples Nos. I-2 to I-6, I-8 to I-17, I-19 to I-22, and I-24 to I-35, in which 0.0005 to 0.03 moles of vanadium in terms of V$_2$O$_5$ was contained to 1 mole of barium constituting barium titanate, and in the X-ray diffraction chart of the dielectric ceramics, the diffraction intensity of the (004) plane indicating the tetragonal system of barium titanate was larger than the diffraction intensity of the (400) plane indicating the cubic system of barium titanate, the insulation resistances measured by setting the DC voltage values applied per unit thickness to 0.1 V and 2.5 V were above $10^4 \Omega$ (In Table 3, the measured values are represented in index expression with "E" interposed between the mantissa part and the exponent part.), and the insulation resistance drop rate measured by setting the DC voltage values applied per unit thickness to 0.1 V and 2.5 V were below 30%. The Curie temperatures were 30 to 120° C., and the relative dielectric constants at a high temperature (85° C.) were above 2010.

In Samples Nos. I-8 to I-10, I-19 to I-22, I-24 to I-29, I-31, and I-32, each incorporating magnesium into the crystal grains, the Curie temperatures of the dielectric ceramics were in the range of 30 to 120° C., and the relative dielectric constant at 85° C. could be increased up to a maximum of 7700. This indicates that the Curie temperatures of the dielectric ceramics can be controlled easily in the range below 125° C. by adjusting the content of magnesium.

In Samples Nos. I-3 to I-6, I-8 to I-17, I-19 to I-22, and I-24 to I-35; each containing 0.001 to 0.03 moles of vanadium in terms of $V_2O_5$ with respect to 1 mole of barium constituting barium titanate, the insulation resistances measured by setting the DC voltage values applied per unit thickness to 0.1 V and 2.5 V were above $3\times10^4\Omega$, and the insulation resistance drop rate measured by setting the DC voltage values applied per unit thickness (1 µm) to 0.1 V and 2.5 V were below 27%.

On the contrary, in Samples Nos. I-1, I-7, I-18, I-23, I-36 and I-37, each being beyond the scope of the present invention, the insulation resistances measured by setting the DC voltage values applied per unit thickness to 0.1 V and 2.5 V were below $10^4\Omega$, or the insulation resistance drop rate measured by setting the DC voltage values applied per unit thickness (1 µm) to 0.1 V and 2.5 V were above 30%. Especially, in Sample No. I-37, in which a presynthesized barium titanate powder was used as its main ingredient, and formulated by adding thereto additives such as $V_2O_5$, the insulation resistance drop rate measured by setting the DC voltage values applied per unit thickness (1 µm) to 0.1 V and 2.5 V was 52%, showing a larger insulation resistance drop than the samples of the present invention. The Curie temperature thereof was 125° C., and the relative dielectric constant at the high temperature was 1760, which was lower than those of the samples of the present invention.

Example II

Firstly, as raw material powders, BT powder, MgO powder, $Y_2O_3$ powder, $Dy_2O_3$ powder, $Ho_2O_3$ powder, $Er_2O_3$ powder, $Tb_4O_7$ powder (as a second rare earth element), $MnCO_3$ powder and $V_2O_5$ powder were prepared. These various kinds of powders were mixed in the proportions shown in Tables 4 and 5, with respect to 100 moles of the BT powder. These raw material powders had a purity of 99.9%. The average grain diameter of the BT powder in each of Samples Nos. II-1 to II-49, II-52 and II-53 was 0.1 µm, that of Samples Nos. II-50 and II-51 was 0.25 µm, and that of Samples Nos. II-54 and II-55 was 0.12 µm. The MgO powder, the $Y_2O_3$ powder, the $Dy_2O_3$ powder, the $Ho_2O_3$ powder, the $Er_2O_3$ powder, the $Tb_4O_7$ powder, the $MnCO_3$ powder and the $V_2O_5$ powder had an average grain diameter of 0.1 µm. As sintering additive, glass powder of the following composition: $SiO_2$=55; BaO=20; CaO=15; and $Li_2O$=10 (% by mole) was used. The amount of addition of the glass powder was 1 part by mass to 100 parts by mass of the BT powder.

These raw material powders were further wet mixed by using zirconia balls having a diameter of 5 mm, and by adding as solvent a mixed solvent of toluene and alcohol. To the wet mixed powder, polyvinyl butyral resin and the mixed solvent of toluene and alcohol were added, and then wet mixed by similarly using the zirconia balls having a diameter of 5 mm, thereby blending a ceramic slurry. This was made into a ceramic green sheet having a thickness of 2.5 µm by doctor blade method.

A plurality of rectangular internal electrode patterns composed mainly of Ni were formed on the upper surface of the ceramic green sheet. In the conductor paste used for the internal electrode patterns, the average grain diameter of Ni powder was 0.3 µm, and 30 parts by mass of the BT powder used in the green sheet as a common material was added to 100 parts by mass of the Ni powder.

Then, 360 ceramic green sheets with the internal electrode pattern printed thereon were stacked on one another to obtain a laminate. Then, 20 ceramic green sheets without the internal electrode pattern were stacked on the upper and lower surfaces of the laminate, respectively. This was then subjected to batch lamination by a press machine under a temperature of 60° C., a pressure of $10^7$ Pa, and time of 10 minutes, and then cut in a predetermined dimension to obtain a multilayer formed body.

The obtained multilayer formed body was subjected to debinding process at a temperature of 300° C. in atmosphere, then fired at 1050 to 1200° C. in hydrogen-nitrogen atmosphere for two hours, and thereafter reoxidized at 1000° C. in nitrogen atmosphere for four hours, thereby manufacturing a capacitor body. The dimension of the capacitor body was 0.95×0.48×0.48 mm³, and the thickness of the dielectric layer was 2 µm, and the effective area per layer of the inner electrode layers was 0.3 mm². The term "effective area" means the area of the overlapped portions between the inner electrode layers formed so as to be exposed to different end surfaces of the capacitor body.

After the fired capacitor body was subjected to barrel polishing, external electrode paste containing Cu powder and glass was applied to both ends of the capacitor body, followed by baking at 850° C., thereby forming the external electrodes. Thereafter, using an electrolytic barrel machine, Ni plating and Sn plating were carried out in this order onto the surfaces of the external electrodes, resulting in a multilayer ceramic capacitor.

The multilayer ceramic capacitors so manufactured were evaluated as follows. Each of the following evaluations used 10 samples, and an average value was determined. The electrostatic capacity was measured under the measuring conditions: a temperature of 25° C., a frequency of 1.0 kHz and a measuring voltage of 1 Vrms, and the relative dielectric constant was calculated from the thickness of the dielectric layers and the entire area of the inner electrode layers. The temperature characteristics of the relative dielectric constant were determined by measuring the electrostatic capacity in the temperature range of –55 to 125° C. The insulation resistance was evaluated under DC voltages of 3.15 V/µm and 12.5 V/µm (In Tables 5 and 6, the insulation resistances are expressed in index expression of common logarithm with "E" interposed between the mantissa part and the exponent part.).

The high temperature load test was carried out at a temperature of 170° C. under an applied voltage of 30 V (15 V/µm). The number of samples for the high temperature load test was 20 for each sample.

The average crystal grain diameter of the crystal grains was determined as follows. That is, an image of a polished surface of the cross section of the dielectric ceramics subjected to cross section polishing, which was produced on a transmission electron microscope, was transferred into a computer, and a diagonal line was drawn on the monitor thereof. The contours of crystal grains existing on the diagonal line were subjected to image processing, thereby obtaining the areas of the individual grains. The diameters of these grains when they were replaced with a circle having the same area were calculated, and the average value of the diameters of about 50 crystal grains thus calculated was employed as the average crystal grain diameter. The ratio of grain growth from dielectric powder was also evaluated.

The ratio of the diffraction intensity of the (004) plane indicating the tetragonal system of barium titanate to the diffraction intensity of the (400) plane indicating the cubic system of barium titanate was determined as follows. That is, using an X-ray diffraction device equipped with a Cu—Kα tube, the measurements were made in the range of angle 2"=99 to 102°, and the ratio of peak intensity was determined.

The composition analysis of each sample as the obtained sintered body was performed by ICP analysis or atomic absorption spectrometry. Specifically, the substance made by mixing and melting the obtained dielectric ceramics with boron and sodium carbonate was dissolved in hydrochloric acid. Firstly, the qualitative analysis of the elements contained in the dielectric ceramics was carried out by atomic absorption spectrometry, and then the specified individual elements were quantified by subjecting them to ICP emission spectrochemical analysis using a solution obtained by diluting a standard solution as a standard sample. The amount of oxygen was determined by converting the valence of each element to a valence shown in the period table.

The formulated compositions and the firing temperatures are shown in Tables 4 and 5. The compositions in the sintered body in terms of the oxides of the individual elements are shown in Tables 6 and 7. The results of the characteristics are shown in Tables 8 and 9.

TABLE 4

| Sample No. | MgO mole | MnCO$_3$ mole | V$_2$O$_5$ mole | Rare earth element kind | Rare earth element mole | Second rare earth element (Tb$_4$O$_7$) mole | Firing temperature ° C. |
|---|---|---|---|---|---|---|---|
| II-1 | 0.0015 | 0.005 | 0.001 | Y$_2$O$_3$ | 0.01 | 0 | 1130 |
| II-2 | 0.001 | 0.005 | 0.001 | Y$_2$O$_3$ | 0.01 | 0 | 1130 |
| II-3 | 0.0002 | 0.005 | 0.001 | Y$_2$O$_3$ | 0.01 | 0 | 1130 |
| II-4 | 0 | 0.005 | 0.001 | Y$_2$O$_3$ | 0.01 | 0 | 1130 |
| II-5 | 0.0005 | 0.002 | 0.001 | Y$_2$O$_3$ | 0.01 | 0 | 1130 |
| II-6 | 0.0002 | 0.002 | 0.001 | Y$_2$O$_3$ | 0.01 | 0 | 1130 |
| II-7 | 0 | 0.002 | 0.001 | Y$_2$O$_3$ | 0.01 | 0 | 1130 |
| II-8 | 0.0005 | 0 | 0.001 | Y$_2$O$_3$ | 0.01 | 0 | 1130 |
| II-9 | 0.0002 | 0 | 0.001 | Y$_2$O$_3$ | 0.01 | 0 | 1130 |
| II-10 | 0 | 0 | 0.001 | Y$_2$O$_3$ | 0.01 | 0 | 1130 |
| II-11 | 0 | 0.005 | 0.0005 | Y$_2$O$_3$ | 0.01 | 0 | 1130 |
| II-12 | 0 | 0.005 | 0.0012 | Y$_2$O$_3$ | 0.01 | 0 | 1130 |
| II-13 | 0 | 0.005 | 0.0015 | Y$_2$O$_3$ | 0.01 | 0 | 1130 |
| II-14 | 0 | 0.005 | 0.002 | Y$_2$O$_3$ | 0.01 | 0 | 1130 |
| II-15 | 0 | 0.005 | 0.003 | Y$_2$O$_3$ | 0.01 | 0 | 1130 |
| II-16 | 0 | 0.005 | 0.004 | Y$_2$O$_3$ | 0.01 | 0 | 1130 |
| II-17 | 0.0015 | 0.005 | 0.001 | Y$_2$O$_3$ | 0.01 | 0.002 | 1130 |
| II-18 | 0.001 | 0.005 | 0.001 | Y$_2$O$_3$ | 0.01 | 0.002 | 1130 |
| II-19 | 0.0002 | 0.005 | 0.001 | Y$_2$O$_3$ | 0.01 | 0.002 | 1130 |
| II-20 | 0 | 0.005 | 0.001 | Y$_2$O$_3$ | 0.01 | 0.002 | 1130 |
| II-21 | 0.0005 | 0.002 | 0.001 | Y$_2$O$_3$ | 0.01 | 0.002 | 1130 |
| II-22 | 0.0002 | 0.002 | 0.001 | Y$_2$O$_3$ | 0.01 | 0.002 | 1130 |
| II-23 | 0 | 0.002 | 0.001 | Y$_2$O$_3$ | 0.01 | 0.002 | 1130 |
| II-24 | 0.0005 | 0.001 | 0.001 | Y$_2$O$_3$ | 0.01 | 0.002 | 1130 |
| II-25 | 0.0002 | 0.001 | 0.001 | Y$_2$O$_3$ | 0.01 | 0.002 | 1130 |
| II-26 | 0 | 0.001 | 0.001 | Y$_2$O$_3$ | 0.01 | 0.002 | 1130 |
| II-27 | 0.0005 | 0 | 0.001 | Y$_2$O$_3$ | 0.01 | 0.002 | 1130 |

TABLE 5

| Sample No. | MgO mole | MnCO$_3$ mole | V$_2$O$_5$ mole | Rare earth element kind | Rare earth element mole | Second rare earth element (Tb$_4$O$_7$) mole | Firing temperature ° C. |
|---|---|---|---|---|---|---|---|
| II-28 | 0.0002 | 0 | 0.001 | Y$_2$O$_3$ | 0.01 | 0.002 | 1130 |
| II-29 | 0 | 0 | 0.001 | Y$_2$O$_3$ | 0.01 | 0.002 | 1130 |
| II-30 | 0 | 0 | 0.001 | Y$_2$O$_3$ | 0.01 | 0.0005 | 1130 |
| II-31 | 0 | 0 | 0.001 | Y$_2$O$_3$ | 0.01 | 0.001 | 1130 |
| II-32 | 0 | 0 | 0.001 | Y$_2$O$_3$ | 0.01 | 0.003 | 1130 |
| II-33 | 0 | 0 | 0.001 | Y$_2$O$_3$ | 0.01 | 0.004 | 1130 |
| II-34 | 0 | 0.005 | 0.0005 | Y$_2$O$_3$ | 0.01 | 0.002 | 1130 |
| II-35 | 0 | 0.005 | 0.0012 | Y$_2$O$_3$ | 0.01 | 0.002 | 1130 |
| II-36 | 0 | 0.005 | 0.0015 | Y$_2$O$_3$ | 0.01 | 0.002 | 1130 |
| II-37 | 0 | 0.005 | 0.002 | Y$_2$O$_3$ | 0.01 | 0.002 | 1130 |
| II-38 | 0 | 0.005 | 0.003 | Y$_2$O$_3$ | 0.01 | 0.002 | 1130 |
| II-39 | 0 | 0.005 | 0.004 | Y$_2$O$_3$ | 0.01 | 0.002 | 1130 |
| II-40 | 0 | 0 | 0.001 | Dy$_2$O$_3$ | 0.01 | 0.002 | 1130 |
| II-41 | 0 | 0 | 0.001 | Ho$_2$O$_3$ | 0.01 | 0.002 | 1130 |
| II-42 | 0 | 0 | 0.001 | Er$_2$O$_3$ | 0.01 | 0.002 | 1130 |
| II-43 | 0 | 0 | 0.001 | Y$_2$O$_3$ | 0 | 0.002 | 1130 |
| II-44 | 0 | 0 | 0.001 | Y$_2$O$_3$ | 0.005 | 0.002 | 1130 |
| II-45 | 0 | 0 | 0.001 | Y$_2$O$_3$ | 0.015 | 0.002 | 1130 |
| II-46 | 0 | 0 | 0.001 | Y$_2$O$_3$ | 0.02 | 0.002 | 1130 |
| II-47 | 0 | 0.007 | 0.001 | Y$_2$O$_3$ | 0.01 | 0.002 | 1130 |
| II-48 | 0 | 0 | 0.001 | Y$_2$O$_3$ | 0.01 | 0.002 | 1200 |
| II-49 | 0 | 0 | 0.001 | Y$_2$O$_3$ | 0.01 | 0.002 | 1220 |
| II-50 | 0 | 0 | 0.001 | Y$_2$O$_3$ | 0.01 | 0.002 | 1050 |

TABLE 5-continued

| Sample No. | MgO mole | MnCO₃ mole | V₂O₅ mole | Rare earth element kind | Rare earth element mole | Second rare earth element (Tb₄O₇) mole | Firing temperature ° C. |
|---|---|---|---|---|---|---|---|
| II-51 | 0 | 0 | 0.001 | Y₂O₃ | 0.01 | 0.002 | 1100 |
| II-52 | 0 | 0 | 0.001 | Y₂O₃ | 0.004 | 0.002 | 1130 |

TABLE 6

| Sample No. | MgO mole | MnO mole | V₂O₅ mole | Rare earth element kind | Rare earth element mole | Second rare earth element (Tb₄O₇) mole |
|---|---|---|---|---|---|---|
| II-1 | 0.0015 | 0.005 | 0.001 | Y₂O₃ | 0.01 | 0 |
| II-2 | 0.001 | 0.005 | 0.001 | Y₂O₃ | 0.01 | 0 |
| II-3 | 0.0002 | 0.005 | 0.001 | Y₂O₃ | 0.01 | 0 |
| II-4 | 0 | 0.005 | 0.001 | Y₂O₃ | 0.01 | 0 |
| II-5 | 0.0005 | 0.002 | 0.001 | Y₂O₃ | 0.01 | 0 |
| II-6 | 0.0002 | 0.002 | 0.001 | Y₂O₃ | 0.01 | 0 |
| II-7 | 0 | 0.002 | 0.001 | Y₂O₃ | 0.01 | 0 |
| II-8 | 0.0005 | 0 | 0.001 | Y₂O₃ | 0.01 | 0 |
| II-9 | 0.0002 | 0 | 0.001 | Y₂O₃ | 0.01 | 0 |
| II-10 | 0 | 0 | 0.001 | Y₂O₃ | 0.01 | 0 |
| II-11 | 0 | 0.005 | 0.0005 | Y₂O₃ | 0.01 | 0 |
| II-12 | 0 | 0.005 | 0.0012 | Y₂O₃ | 0.01 | 0 |
| II-13 | 0 | 0.005 | 0.0015 | Y₂O₃ | 0.01 | 0 |
| II-14 | 0 | 0.005 | 0.002 | Y₂O₃ | 0.01 | 0 |
| II-15 | 0 | 0.005 | 0.003 | Y₂O₃ | 0.01 | 0 |
| II-16 | 0 | 0.005 | 0.004 | Y₂O₃ | 0.01 | 0 |
| II-17 | 0.0015 | 0.005 | 0.001 | Y₂O₃ | 0.01 | 0.002 |
| II-18 | 0.001 | 0.005 | 0.001 | Y₂O₃ | 0.01 | 0.002 |
| II-19 | 0.0002 | 0.005 | 0.001 | Y₂O₃ | 0.01 | 0.002 |
| II-20 | 0 | 0.005 | 0.001 | Y₂O₃ | 0.01 | 0.002 |
| II-21 | 0.0005 | 0.002 | 0.001 | Y₂O₃ | 0.01 | 0.002 |
| II-22 | 0.0002 | 0.002 | 0.001 | Y₂O₃ | 0.01 | 0.002 |
| II-23 | 0 | 0.002 | 0.001 | Y₂O₃ | 0.01 | 0.002 |
| II-24 | 0.0005 | 0.001 | 0.001 | Y₂O₃ | 0.01 | 0.002 |
| II-25 | 0.0002 | 0.001 | 0.001 | Y₂O₃ | 0.01 | 0.002 |
| II-26 | 0 | 0.001 | 0.001 | Y₂O₃ | 0.01 | 0.002 |
| II-27 | 0.0005 | 0 | 0.001 | Y₂O₃ | 0.01 | 0.002 |

TABLE 7

| Sample No. | MgO mole | MnO mole | V₂O₅ mole | Rare earth element kind | Rare earth element mole | Second rare earth element (Tb₄O₇) mole |
|---|---|---|---|---|---|---|
| II-28 | 0.0002 | 0 | 0.001 | Y₂O₃ | 0.01 | 0.002 |
| II-29 | 0 | 0 | 0.001 | Y₂O₃ | 0.01 | 0.002 |
| II-30 | 0 | 0 | 0.001 | Y₂O₃ | 0.01 | 0.0005 |
| II-31 | 0 | 0 | 0.001 | Y₂O₃ | 0.01 | 0.001 |
| II-32 | 0 | 0 | 0.001 | Y₂O₃ | 0.01 | 0.003 |
| II-33 | 0 | 0 | 0.001 | Y₂O₃ | 0.01 | 0.004 |
| II-34 | 0 | 0.005 | 0.0005 | Y₂O₃ | 0.01 | 0.002 |
| II-35 | 0 | 0.005 | 0.0012 | Y₂O₃ | 0.01 | 0.002 |
| II-36 | 0 | 0.005 | 0.0015 | Y₂O₃ | 0.01 | 0.002 |
| II-37 | 0 | 0.005 | 0.002 | Y₂O₃ | 0.01 | 0.002 |
| II-38 | 0 | 0.005 | 0.003 | Y₂O₃ | 0.01 | 0.002 |
| II-39 | 0 | 0.005 | 0.004 | Y₂O₃ | 0.01 | 0.002 |
| II-40 | 0 | 0 | 0.001 | Dy₂O₃ | 0.01 | 0.002 |
| II-41 | 0 | 0 | 0.001 | Ho₂O₃ | 0.01 | 0.002 |
| II-42 | 0 | 0 | 0.001 | Er₂O₃ | 0.01 | 0.002 |
| II-43 | 0 | 0 | 0.001 | Y₂O₃ | 0 | 0.002 |
| II-44 | 0 | 0 | 0.001 | Y₂O₃ | 0.005 | 0.002 |
| II-45 | 0 | 0 | 0.001 | Y₂O₃ | 0.015 | 0.002 |
| II-46 | 0 | 0 | 0.001 | Y₂O₃ | 0.02 | 0.002 |
| II-47 | 0 | 0.007 | 0.001 | Y₂O₃ | 0.01 | 0.002 |
| II-48 | 0 | 0 | 0.001 | Y₂O₃ | 0.01 | 0.002 |
| II-49 | 0 | 0 | 0.001 | Y₂O₃ | 0.01 | 0.002 |
| II-50 | 0 | 0 | 0.001 | Y₂O₃ | 0.01 | 0.002 |
| II-51 | 0 | 0 | 0.001 | Y₂O₃ | 0.01 | 0.002 |
| II-52 | 0 | 0 | 0.001 | Y₂O₃ | 0.004 | 0.002 |

TABLE 8

| Sample No. | Average grain diameter of crystal grains μm | Ratio of grain growth % | Comparison of intensity of X-ray diffraction chart** | Relative dielectric constant (25° C.) | Dielectric loss (25° C.) % | Insulation resistance # 3.15 V/μm Ω | Insulation resistance # 12.5 V/μm Ω | Temperature characteristics of relative dielectric constant X7R*** | life characteristics in the high temperature load test (170° C., 30 V) hrs. |
|---|---|---|---|---|---|---|---|---|---|
| II-1 | 0.320 | 320 | 1.6 | 3100 | 21 | 7.0E+08 | 7.0E+08 | X | 8 |
| II-2 | 0.290 | 290 | 1.6 | 3250 | 19 | 7.0E+08 | 7.0E+08 | ○ | 53 |
| II-3 | 0.280 | 280 | 1.6 | 3200 | 18 | 7.0E+08 | 7.0E+08 | ○ | 54 |
| II-4 | 0.270 | 270 | 1.6 | 3150 | 17 | 7.0E+08 | 7.2E+08 | ○ | 56 |
| II-5 | 0.290 | 290 | 1.6 | 3250 | 18 | 6.0E+08 | 6.0E+08 | ○ | 53 |
| II-6 | 0.260 | 260 | 1.6 | 3400 | 17 | 6.0E+08 | 6.0E+08 | ○ | 57 |
| II-7 | 0.270 | 270 | 1.6 | 3200 | 16 | 6.0E+08 | 6.2E+08 | ○ | 57 |
| II-8 | 0.300 | 300 | 1.6 | 3300 | 17 | 5.0E+08 | 5.0E+08 | ○ | 56 |
| II-9 | 0.280 | 280 | 1.6 | 3330 | 16 | 5.0E+08 | 5.0E+08 | ○ | 57 |
| II-10 | 0.280 | 280 | 1.6 | 3300 | 15 | 5.0E+08 | 5.2E+08 | ○ | 61 |
| II-11 | 0.270 | 270 | 1.3 | 3500 | 17 | 8.0E+08 | 8.3E+08 | ○ | 50 |
| II-12 | 0.280 | 280 | 1.4 | 3200 | 17 | 6.5E+08 | 6.6E+08 | ○ | 53 |
| II-13 | 0.280 | 280 | 1.5 | 3100 | 18 | 4.5E+08 | 4.7E+08 | ○ | 56 |
| II-14 | 0.320 | 320 | 1.8 | 3050 | 23 | 3.5E+08 | 3.6E+08 | ○ | 54 |
| II-15 | 0.310 | 310 | 2 | 3020 | 23 | 3.0E+08 | 3.2E+08 | ○ | 56 |
| II-16 | 0.310 | 310 | 2.2 | 3000 | 26 | 9.0E+07 | 9.0E+07 | ○ | 56 |
| II-17 | 0.330 | 330 | 1.6 | 3140 | 21 | 7.2E+08 | 7.2E+08 | X | 13 |
| II-18 | 0.290 | 290 | 1.6 | 3300 | 19 | 7.2E+08 | 7.2E+08 | ○ | 62 |

TABLE 8-continued

| Sample No. | Average grain diameter of crystal grains μm | Ratio of grain growth % | Comparison of intensity of X-ray diffraction chart** | Relative dielectric constant (25° C.) | Dielectric loss (25° C.) % | Insulation resistance # 3.15 V/μm Ω | Insulation resistance # 12.5 V/μm Ω | Temperature characteristics of relative dielectric constant X7R*** | life characteristics in the high temperature load test (170° C., 30 V) hrs. |
|---|---|---|---|---|---|---|---|---|---|
| II-19 | 0.280 | 280 | 1.6 | 3250 | 18 | 7.2E+08 | 7.2E+08 | ○ | 65 |
| II-20 | 0.280 | 280 | 1.6 | 3130 | 17 | 7.2E+08 | 7.4E+08 | ○ | 67 |
| II-21 | 0.300 | 300 | 1.6 | 3230 | 18 | 6.2E+08 | 6.2E+08 | ○ | 64 |
| II-22 | 0.280 | 280 | 1.6 | 3240 | 17 | 6.2E+08 | 6.2E+08 | ○ | 65 |
| II-23 | 0.280 | 280 | 1.6 | 3180 | 17 | 6.2E+08 | 6.3E+08 | ○ | 73 |
| II-24 | 0.290 | 290 | 1.6 | 3160 | 18 | 6.2E+08 | 6.2E+08 | ○ | 67 |
| II-25 | 0.280 | 280 | 1.6 | 3210 | 17 | 5.3E+08 | 5.3E+08 | ○ | 70 |
| II-26 | 0.270 | 270 | 1.6 | 3260 | 16 | 5.3E+08 | 5.5E+08 | ○ | 74 |
| II-27 | 0.300 | 300 | 1.6 | 3280 | 18 | 5.3E+08 | 5.3E+08 | ○ | 69 |

**; Ixt/Ixc ratio, where Ixt is diffraction intensity of (004) plane indicating tetragonal system, and Ixc is diffraction intensity of (400) plane indicating cubic system Ixt/Ixc ratio is more than 1, when diffraction intensity of (004) plane indicating tetragonal system is larger than diffraction intensity of (400) plane indicating cubic system. Ixt/Ixc ratio is less than 1, when diffraction intensity of (004) plane indicating tetragonal system is smaller than diffraction intensity of (400) plane indicating cubic system.
***; ○ means that X7R is satisfied, X means that X7R is not satisfied.
Insulation resistance is indicated by exponential by inserting E between significand and exponent part.

TABLE 9

| Sample No. | Average grain diameter of crystal grains μm | Ratio of grain growth % | Comparison of intensity of X-ray diffraction chart** | Relative dielectric constant (25° C.) | Dielectric loss (25° C.) % | Insulation resistance # 3.15 V/μm Ω | Insulation resistance # 12.5 V/μm Ω | Temperature characteristics of relative dielectric constant X7R*** | life characteristics in high temperature load test (170° C., 30 V) hrs. |
|---|---|---|---|---|---|---|---|---|---|
| II-28 | 0.280 | 280 | 1.6 | 3200 | 17 | 5.2E+08 | 5.2E+08 | ○ | 69 |
| II-29 | 0.270 | 270 | 1.6 | 3250 | 15 | 5.2E+08 | 5.4E+08 | ○ | 74 |
| II-30 | 0.270 | 270 | 1.6 | 3400 | 15 | 5.2E+08 | 5.4E+08 | ○ | 63 |
| II-31 | 0.280 | 280 | 1.6 | 3300 | 15 | 5.2E+08 | 5.4E+08 | ○ | 69 |
| II-32 | 0.280 | 280 | 1.6 | 3300 | 15 | 5.2E+08 | 5.4E+08 | ○ | 65 |
| II-33 | 0.270 | 270 | 1.6 | 3100 | 15 | 5.3E+08 | 5.5E+08 | ○ | 63 |
| II-34 | 0.260 | 260 | 1.4 | 3350 | 17 | 8.1E+08 | 8.2E+08 | ○ | 63 |
| II-35 | 0.280 | 280 | 1.4 | 3200 | 17 | 6.6E+08 | 6.7E+08 | ○ | 74 |
| II-36 | 0.290 | 290 | 1.5 | 3150 | 18 | 4.6E+08 | 4.7E+08 | ○ | 86 |
| II-37 | 0.310 | 310 | 1.8 | 2950 | 23 | 3.7E+08 | 3.8E+08 | ○ | 88 |
| II-38 | 0.300 | 300 | 2 | 2900 | 23 | 3.2E+08 | 3.3E+08 | ○ | 59 |
| II-39 | 0.300 | 300 | 2.2 | 2750 | 26 | 9.0E+07 | 9.0E+07 | ○ | 59 |
| II-40 | 0.270 | 270 | 1.6 | 3100 | 15 | 5.1E+08 | 5.2E+08 | ○ | 72 |
| II-41 | 0.270 | 270 | 1.6 | 3140 | 15 | 5.1E+08 | 5.3E+08 | ○ | 75 |
| II-42 | 0.280 | 280 | 1.6 | 3170 | 15 | 5.1E+08 | 5.2E+08 | ○ | 74 |
| II-43 | 0.280 | 280 | 1.6 | 3230 | 16 | 5.0E+08 | 2.0E+08 | ○ | 13 |
| II-44 | 0.280 | 280 | 1.6 | 3250 | 15 | 5.0E+08 | 5.1E+08 | ○ | 71 |
| II-45 | 0.270 | 270 | 1.6 | 3230 | 15 | 5.1E+08 | 5.2E+08 | ○ | 70 |
| II-46 | 0.280 | 280 | 1.6 | 2740 | 15 | 5.2E+08 | 5.3E+08 | ○ | 73 |
| II-47 | 0.280 | 280 | 1.6 | 2780 | 16 | 5.1E+08 | 5.2E+08 | ○ | 74 |
| II-48 | 0.370 | 370 | 1.6 | 3640 | 19 | 7.2E+08 | 7.3E+08 | ○ | 59 |
| II-49 | 0.400 | 400 | 1.6 | 3680 | 25 | 7.2E+08 | 7.3E+08 | ○ | 57 |
| II-50 | 0.210 | 210 | 1.6 | 2800 | 24 | 7.1E+08 | 7.2E+08 | ○ | 52 |
| II-51 | 0.240 | 240 | 1.6 | 2840 | 24 | 7.1E+08 | 7.2E+08 | ○ | 53 |
| II-52 | 0.280 | 280 | 1.6 | 3240 | 15 | 5.0E+08 | 5.1E+08 | ○ | 61 |

**; Ixt/Ixc ratio, where Ixt is diffraction intensity of (004) plane indicating tetragonal system, and Ixc is diffraction intensity of (400) plane indicating cubic system Ixt/Ixc ratio is more than 1, when diffraction intensity of (004) plane indicating tetragonal system is larger than diffraction intensity of (400) plane indicating cubic system. Ixt/Ixc ratio is less than 1, when diffraction intensity of (004) plane indicating tetragonal system is smaller than diffraction intensity of (400) plane indicating cubic system.
***; ○ means that X7R is satisfied, X means that X7R is not satisfied.
Insulation resistance is indicated by exponential by inserting E between significand and exponent part.

As apparent from the results of Tables 4 to 9, Samples Nos. II-2 to II-15, II-18 to II-38, II-40 to II-42, II-44, II-45, and II-48 to II-52 of the present invention, each being constituted from crystal grains composed mainly of barium titanate and containing 0.0005 to 0.003 moles of vanadium in terms of $V_2O_5$, 0 to 0.001 moles of magnesium in terms of MgO, 0 to 0.005 moles of manganese in terms of MnO, and 0.004 to 0.015 moles of one kind of rare earth element (RE) selected from yttrium, dysprosium, holmium and erbium in terms of $RE_2O_3$, with respect to 1 mole of barium constituting the barium titanate, in which in the X-ray diffraction chart of the dielectric ceramics, the diffraction intensity of the (004) plane indicating the tetragonal system of barium titanate is larger than the diffraction intensity of the (400) plane indicating the cubic system of barium titanate, achieved the dielectric ceramics in which the relative dielectric constant was above 2800; the temperature change of relative dielectric constant satisfied the X7R characteristic of EIA standard; there was no insulation resistance drop when the DC voltage values applied per unit thickness (1 μm) were set to 3.15 V and 12.5 V; and the voltage dependence of the insulation resistance was further reduced. The life characteristics in the high temperature load test was above 50 hours under conditions of 170° C. and 15 V/μm.

Samples Nos. II-4, II-7, II-10 to II-15, II-20, 11-23, II-26, II-29 to II-38, II-40 to II-45, and II-48 to II-52, each being composed mainly of barium titanate, and containing 0.0005 to 0.003 moles of vanadium in terms of $V_2O_5$, 0 to 0.0005 moles of manganese in terms of MnO, and 0.004 to 0.015 moles of one kind of rare earth element (RE) selected from yttrium, dysprosium, holmium and erbium in terms of $RE_2O_3$, and setting the content of magnesium to zero mole in terms of MgO, with respect to 1 mole of barium constituting the barium titanate, achieved the dielectric ceramics having high insulation properties and exhibiting a tendency that the insulation resistance increased (a positive change) between 3.15 V and 12.5 V, which were DC voltages applied per unit thickness (1 μm) of the dielectric layer.

In Samples Nos. II-10, and II-29 to II-33, each being composed mainly of barium titanate, and containing 0.0005 to 0.003 moles of vanadium in terms of $V_2O_5$, and 0.004 to 0.015 moles of one kind of rare earth element (RE) selected from yttrium, dysprosium, holmium and erbium in terms of $RE_2O_3$, and setting magnesium to zero mole in terms of MgO, and setting manganese to zero mole in terms of MnO, with respect to 100 moles of barium constituting the barium titanate, it was confirmed that from a comparison between samples containing the same amount of vanadium and the same amount of the rare earth element (RE), the dielectric loss could be decreased than Samples Nos. II-2 to II-9 and Samples Nos. II-18 to II-28, which were the dielectric ceramics containing magnesium and manganese.

In Samples Nos. II-18 to II-32, and II-34 to II-38, each containing 0.0005 to 0.003 moles of vanadium in terms of $V_2O_5$, 0.004 to 0.015 moles of one kind of rare earth element (RE) selected from yttrium, dysprosium, holmium and erbium in terms of $RE_2O_3$, 0 to 0.001 moles of magnesium in terms of MgO, 0 to 0.005 moles of manganese in terms of MnO, and 0.0005 to 0.003 moles of terbium in terms of $Tb_4O_7$, with respect to 1 mole of barium constituting barium titanate, it was confirmed that the insulation resistances of these dielectric ceramics were enhanced, and when these dielectric ceramics were applied to the dielectric layers of the multilayer ceramic capacitor, the life characteristics in the high temperature load test were further improved than Samples Nos. II-2 to II-9, and II-11 to II-15, each containing no terbium.

The invention claimed is:

1. A dielectric ceramics comprising:
   crystal grains comprised mainly of barium titanate and containing vanadium; and
   a grain boundary phase between the crystal grains,
   wherein the dielectric ceramics comprises 0.0005 to 0.03 moles of vanadium in terms of $V_2O_5$, with respect to 1 mole of barium constituting the barium titanate, and
   wherein, in an X-ray diffraction chart of the dielectric ceramics, a diffraction intensity of (004) plane indicating the tetragonal system of barium titanate is larger than a diffraction intensity of (400) plane indicating the cubic system of barium titanate.

2. The dielectric ceramics according to claim 1, wherein magnesium is contained within the crystal grains.

3. The dielectric ceramics according to claim 1, wherein the dielectric ceramics comprise, with respect to 1 mole of barium constituting the barium titanate,
   0.0005 to 0.003 moles of vanadium in terms of $V_2O_5$,
   0 to 0.001 moles of magnesium in terms of MgO,
   0 to 0.005 moles of manganese in terms of MnO, and
   0.004 to 0.015 moles of one kind of rare earth element (RE) selected from yttrium, dysprosium, holmium and erbium in terms of $RE_2O_3$.

4. The dielectric ceramics according to claim 3, wherein the content of the magnesium is zero mole in terms of MgO.

5. The dielectric ceramics according to claim 4, wherein the content of the manganese is zero mole in terms of MnO.

6. The dielectric ceramics according to claim 3, wherein 0.003 moles or less of terbium in terms of $Tb_4O_7$ is further contained with respect to 1 mole of barium constituting the barium titanate.

7. A multilayer ceramic capacitor comprising a laminate made up of dielectric layers composed of the dielectric ceramics according to claim 1, and inner electrode layers.

* * * * *